(12) United States Patent
Skupin et al.

(10) Patent No.: US 11,172,011 B2
(45) Date of Patent: Nov. 9, 2021

(54) PORTIONED VIDEO STREAMING CONCEPTS

(71) Applicant: Fraunhofer-Gesellschaft zur Foerderung der angewandten Forschung e.V., Munich (DE)

(72) Inventors: Robert Philipp Skupin, Berlin (DE); Cornelius Hellge, Berlin (DE); Thomas Schierl, Berlin (DE); Yago Sánchez De La Fuente, Berlin (DE); Dimitri Podborski, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/731,754

(22) Filed: Dec. 31, 2019

(65) Prior Publication Data

US 2020/0137136 A1 Apr. 30, 2020

Related U.S. Application Data

(63) Continuation of application No. PCT/EP2018/068445, filed on Jul. 6, 2018.

(30) Foreign Application Priority Data

Jul. 6, 2017 (EP) .................................. 17180149

(51) Int. Cl.
*H04L 29/06* (2006.01)
*H04N 21/2343* (2011.01)
(Continued)

(52) U.S. Cl.
CPC ......... *H04L 65/607* (2013.01); *H04N 19/167* (2014.11); *H04N 19/172* (2014.11); *H04N 19/176* (2014.11); *H04N 21/234327* (2013.01)

(58) Field of Classification Search
CPC ............. H04N 19/176; H04N 21/2347; H04N 21/8456; H04N 21/23476;
(Continued)

(56) References Cited

U.S. PATENT DOCUMENTS 10,631,070 B2 * 4/2020 Kalish ................. G11B 27/031
10,911,506 B2 * 2/2021 Oyman ................... H04L 65/80
(Continued)

FOREIGN PATENT DOCUMENTS

CN 104255010 A 12/2014
CN 104284208 A 1/2015
(Continued)

OTHER PUBLICATIONS

Mousa Farajallah et al., ROI encryption for the HEVC coded video contents, 2015 IEEE International Conference on Image Processing (ICIP), USA, IEEE, Sep. 27, 2015, pp. 3096-3100, URL, https://ieeexplore.ieee.org/stamp/stamp.jsp?tp=&arnumber=7351373, 2015.
(Continued)

*Primary Examiner* — Abdullahi E Salad
(74) *Attorney, Agent, or Firm* — Perkins Coie LLP; Michael A. Glenn

(57) ABSTRACT

Portion- or tile-based video streaming concepts are described. In one example aspect, a server includes a processor that is configured to provide a manifest file to a client. The manifest file includes first parameter sets each defining one of picture-portion specific adaptation sets of representations. Each first parameter set comprises a quality level for each representation of the picture-portion specific adaptation set defined by the respective first parameter set. The manifest file also includes at least one second parameter set defining a preselection adaptation set which assigns to each of regions of an output picture area one of the picture-portion specific adaptation sets.

19 Claims, 23 Drawing Sheets

(51) Int. Cl.
*H04N 19/172* (2014.01)
*H04N 19/176* (2014.01)
*H04N 19/167* (2014.01)

(58) Field of Classification Search
CPC ... H04N 21/234345; H04N 21/234327; H04N 21/26258; H04N 19/167; H04N 19/172; H04L 65/607; H04L 2209/60
See application file for complete search history.

(56) References Cited

U.S. PATENT DOCUMENTS

| | | | |
|---|---|---|---|
| 2003/0068041 A1 | 4/2003 | Wee et al. | |
| 2003/0070081 A1 | 4/2003 | Wee et al. | |
| 2013/0290698 A1 | 10/2013 | Giladi et al. | |
| 2016/0044346 A1 | 2/2016 | Braness et al. | |
| 2017/0118540 A1 | 4/2017 | Thomas et al. | |
| 2017/0171282 A1 | 6/2017 | Denoual et al. | |
| 2017/0223083 A1 | 8/2017 | Maze et al. | |
| 2017/0272485 A1* | 9/2017 | Gordon | H04L 65/601 |
| 2017/0374411 A1* | 12/2017 | Lederer | H04N 21/462 |
| 2018/0098077 A1* | 4/2018 | Skupin | H04N 19/503 |
| 2018/0213296 A1* | 7/2018 | Kellar | H04N 21/6338 |

FOREIGN PATENT DOCUMENTS

| | | |
|---|---|---|
| CN | 105187851 A | 12/2015 |
| CN | 106664443 A | 5/2017 |
| JP | 2005532700 A | 10/2005 |
| JP | 2017515336 A | 6/2017 |
| WO | 2006042160 A2 | 4/2006 |
| WO | 2015144735 A1 | 10/2015 |
| WO | 2016022979 A1 | 2/2016 |

OTHER PUBLICATIONS

Qualcomm Incorporated, FS_VR: OMAF Progress [online], 3GPP TSG SA WG4 #93 S4-170324, USA, Internet <URL: http://www.3gpp.org/ftp/tsg_sa/WG4_CODEC/TSGS4_93/Docs/S4-170324.zip>, Apr. 19, 2017, pp. 1-12, 2017.

Robert Skupin et al., HEVC tile based streaming to head mounted displays, 2017 14th IEEE Annual Consumer Communications & Networking Conference (CCNC), IEEE, Jan. 8, 2017, pp. 613-615, URL, https://ieeexplore.ieee.org/stamp/stamp.jsp?tp=&arnumber=7983191, 2017.

Maze, Frederic , MPEG Meeting; Oct. 17-21, 2016; Chengdu; (Motion Picture Expert Group or ISO/IEC JTC1/SC29/WG11),, No. m39255, Oct. 12, 2016 (Oct. 12, 2016), XP030067601, Oct. 2016, 4 pages.

NIST, "Advanced Encryption Standard (AES)", online: http://nvlpubs.nist.gov/nistpubs/FIPS/NIST.FIPS.197.pdf; 2001, 2001.

NIST, "Recommendation for Block 2001 Edition Cipher Modes of Operation", NIST Special Publication 800-38A 2001 Edition, online: http://dx.doi.org/10.6028/NIST.SP.800-38A, 2001.

ISO/IEC 23008-2:2013, Information technology—High efficiency coding and media delivery in heterogeneous environments—Part 2: High efficiency video coding, 2013.

ISO/IEC 23009-1:2014, Information technology—Dynamic adaptive streaming over HTTP (DASH)—Part 1: Media presentation description and segment formats, 2014.

ISO/IEC 14496-12:2015, Information technology—Coding of audiovisual objects—Part 12: ISO base media file format., 2015.

Frederic Maze et al_ISO-IEC JTC1-SC29-WG11_2016_Quality adaptation for tile based streaming in DASH., 2016.

ISO/IEC 23001-7:2016, Information technology—MPEG systems technologies—Part 7: Common encryption in ISO base media file format files., 2016.

ISO/IEC 14496-15:2017, Information technology—Coding of audiovisual objects—Part 15: Carriage of network abstraction layer (NAL) unit structured video in the ISO base media file format, 2017.

Choi, Byeongdoo , et al., "OMAF DIS text with updates based on Berlin OMAF AHG meeting agreements", m40849, Jun. 16, 2017., Jun. 16, 2017.

* cited by examiner

```
aligned(8) class SphereRegionQualityRankingBox extends
FullBox('srqr', 0, 0) {
    unsigned int(8) region_definition_type;
    unsigned int(8) num_regions;
    for (i = 0; i < num_regions; i++) {
        unsigned int(8) quality_ranking;
        unsigned int(2) view_idc;
        if (i == num_regions – 1)
            unsigned int(1) remaining_area_flag;
        else
            bit(1) reserved_bit = 0;
        bit(5) reserved = 0;
        if (remaining_area_flag == 0)
            RegionOnSphereStruct(1);
    }
}
```

Fig. 5a

```
aligned(8) class 2DRegionQualityRankingBox extends FullBox('2dqr', 0, 0) {
    unsigned int(8) num_regions;
    for (i = 0; i < num_regions; i++) {
        unsigned int(8) quality_ranking;
        unsigned int(2) view_idc;
        if (i == num_regions – 1)
            unsigned int(1) remaining_area_flag;
        else
            bit(1) reserved_bit = 0;
        bit(5) reserved = 0;
        if (remaining_area_flag == 0) {
            unsigned int(16) left_offset;
            unsigned int(16) top_offset;
            unsigned int(16) region_width;
            unsigned int(16) region_height;
        }
    }
}
```

Fig. 5b

| @value parameter for RWQR descriptor | use | description |
|---|---|---|
| shape_type | M | Value 0 specifies that the region is indicated through four great rectangles as specified in clause 7.3. Value 1 specifies that the region is indicated through two yaw and two pitch circles as specified in clause 7.3. |
| quality_ranking | M | specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B. |
| view_idc | M | 0 indicates that the content is monoscopic, 1 indicates that the region is on the left view of stereoscopic content, 2 indicates that the region is on the right view of stereoscopic content, 3 indicates that the region is on both the left and right views. |
| remaining_area_flag | M | Value 0 specifies that center_yaw, center_pitch, center_roll, hor_range, and ver_range are present. Value 1 specifies that the region is the area not covered by any other regions defined by RWQR descriptors included in the same element. remaining_area_flag shall not be equal to 1 in more than one RWQR descriptor in the same element. |
| center_yaw | CM | Specifies the yaw of the center point the region in degrees relative to the global coordinate axes. |
| center_pitch | CM | Specifies the pitch of the center point the region in degrees relative to the global coordinate axes. |

Fig. 14 (Part 1)

| @value parameter for RWQR descriptor | use | description |
|---|---|---|
| center_roll | CM | Specifies the roll angle for the region. |
| hor_range | CM | Specifies the horizontal range of the region through the center point of the region. |
| ver_range | CM | Specifies the vertical range of the region through the center point of the region. |
| max_quality_ranking | 0 | specifies the maximum quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B. This value shall be present only when quality_ranking is equal to 0. NOTE: This value specifies the maximum quality boundary, e.g. based on the @qualityRanking attributes of Representations from other Adaptation Sets when Preselection is used |
| min_quality_ranking | 0 | specifies the minimum quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B. This value shall be present only when quality_ranking is equal to 0. NOTE: This value specifies the minimum quality boundary, e.g. based on the @qualityRanking attributes of Representations from other Adaptation Sets when Preselection is used |

Fig. 14 (Part 2)

| @value parameter for RWQR descriptor | use | description |
|---|---|---|
| shape_type | M | Value 0 specifies that the region is indicated through four great rectangles as specified in clause 7.3. Value 1 specifies that the region is indicated through two yaw and two pitch circles as specified in clause 7.3. |
| quality_ranking | M | specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B. |
| view_idc | M | 0 indicates that the content is monoscopic, 1 indicates that the region is on the left view of stereoscopic content, 2 indicates that the region is on the right view of stereoscopic content, 3 indicates that the region is on both the left and right views. |
| remaining_area_flag | M | Value 0 specifies that center_yaw, center_pitch, center_roll, hor_range, and ver_range are present. Value 1 specifies that the region is the area not covered by any other regions defined by RWQR descriptors included in the same element. remaining_area_flag shall not be equal to 1 in more than one RWQR descriptor in the same element. |
| center_yaw | CM | Specifies the yaw of the center point the region in degrees relative to the global coordinate axes. |

Fig. 15 (Part 1)

| @value parameter for RWQR descriptor | use | description |
|---|---|---|
| center_pitch | CM | Specifies the pitch of the center point the region in degrees relative to the global coordinate axes. |
| center_roll | CM | Specifies the roll angle for the region. |
| hor_range | CM | Specifies the horizontal range of the region through the center point of the region. |
| ver_range | CM | Specifies the vertical range of the region through the center point of the region. |
| local_quality_ranking | O | When 0, it specifies that the quality ranking is relative to other regions in the same Adaptation Set and relative to RWQR descriptors and @qualityRanking values in all Adaptation Sets that have the same @value in the Viewpoint element as the Adaptation Set containing this RWQR descriptor When 1, it specifies that the quality ranking is relative only to other regions in the same Adaptation Set and is not relative to RWQR descriptors and @qualityRanking values in all Adaptation Sets that have the same @value in the Viewpoint element as the Adaptation Set containing this RWQR descriptor When not present this value is inferred as 0 |

Fig. 15 (Part 2)

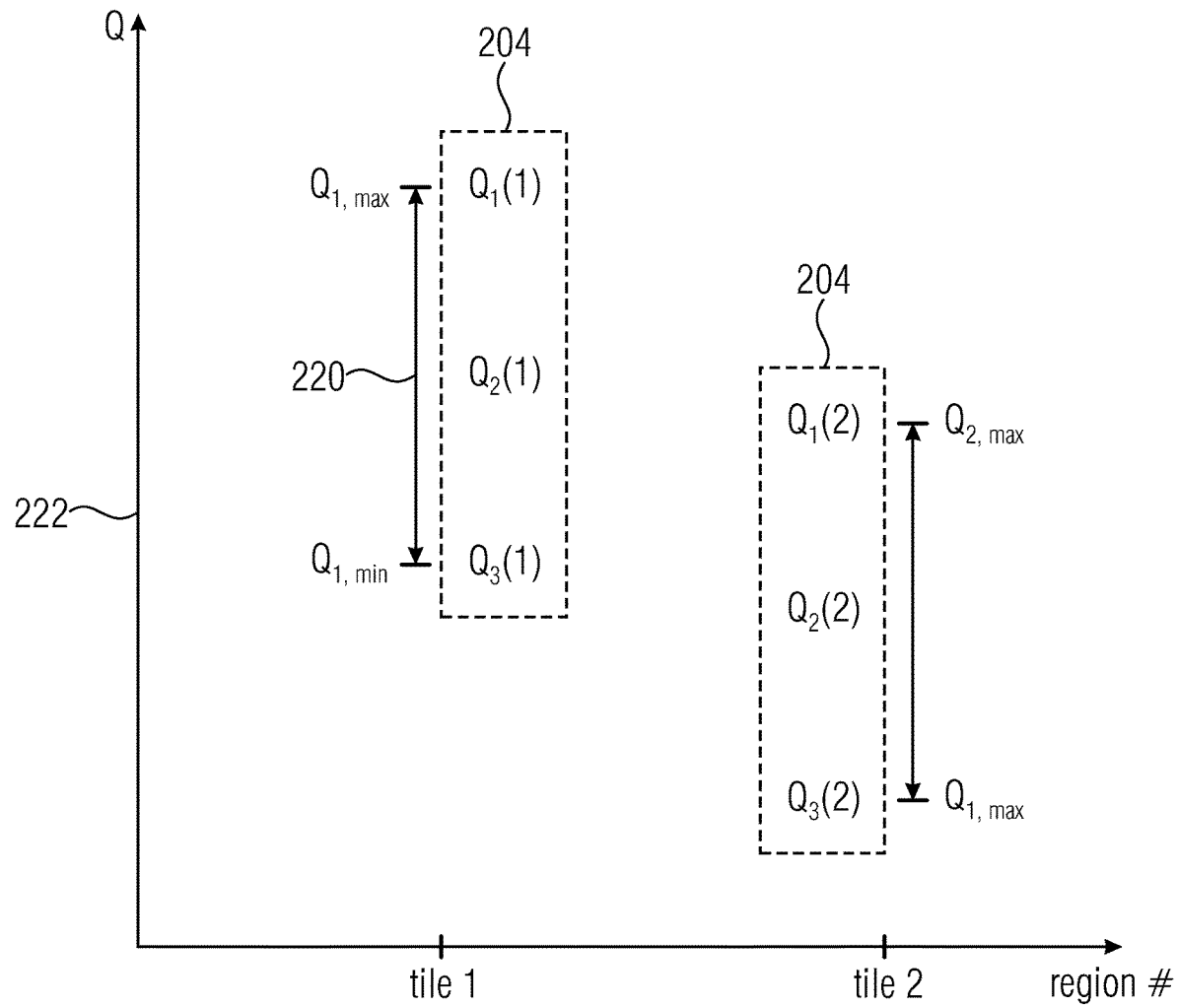
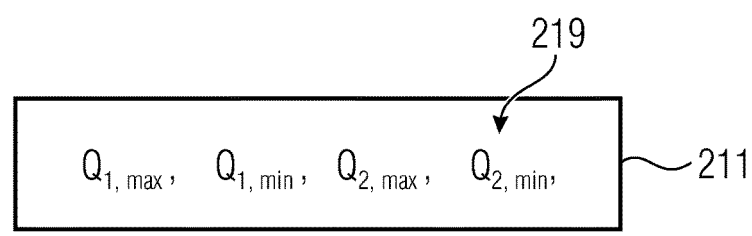
Fig. 19

PORTIONED VIDEO STREAMING CONCEPTS

CROSS-REFERENCE TO RELATED APPLICATIONS

This application is a continuation of copending International Application No. PCT/EP2018/068445, filed Jul. 6, 2018, which is incorporated herein by reference in its entirety, and additionally claims priority from European Application No. 17180149.1, filed Jul. 6, 2017, which is also incorporated herein by reference in its entirety.

The present application is concerned with portion- or tile-based video streaming concepts.

BACKGROUND OF THE INVENTION

Media encryption in video streaming systems nowadays is based a cipher functions that allow to encrypt media data (referred to as plaintext) using a forward cipher function and a key and to decrypt the result (referred to as ciphertext) using the inverse function and the key in a block-wise fashion, e.g. following methods of the Advanced Encryption Standard (AES) [1]. In addition, a fundamental concept of media encryption is to alter the plaintext before it is passed to the forwards cipher function to ensure uniqueness of ciphertext blocks, i.e. repeating identical plaintext blocks such as common word or syntax structures should not result in identical ciphertext blocks. Plaintext is altered using a computationally inexpensive operation, namely exclusive-OR (XOR), of each plaintext block and encryption metadata before entering the cipher function (and likewise after executing the inverse function). In most approaches, the encryption metadata for the first block consists of an initialization value or Initialization Vector (IV). Many block operation mode variants [2] exist that define how encryption metadata of the following plaintext block is generated. The two variants of this concept most prevalent in the encrypted media streaming market today are based on maintaining a counter (CTR) as part of the encryption metadata and cipher block chaining (CBC) as illustrated in FIG. 1a,b, in which the current ciphertext block is used as encryption metadata of the following plaintext block.

The MPEG Common Encryption Standard [3] defines encryption of media data in the MPEG ecosystem, i.e. coded media data encapsulated in an ISO Base Media File Format [4][5] (FF) container, by defining various schemes inspired by AES-CTR and AES-CBC. In particular, the schemes describe which part of the coded media data constitutes the plaintext to be encrypted. The encryption schemes operate on blocks of 16 bytes of plaintext. Understandably, it is possible to encrypt less than all of the coded media data and still prohibit unauthorized usage of the encrypted media data (i.e. unauthorized decryption in absence of encryption key) through the various spatial and temporal dependencies within coded data.

In context of coded video data contained in a FF container, the coded data associated to a single time instance and resulting in a video picture after decoding, is usually referred to as a sample. The samples within a FF container can be further logically and spatially subdivided into subsample, e.g. when video codec tools for spatial subdivision, e.g. slices or tiles in HEVC [6], are used achieve a level of independence from codec perspective.

Several encryption schemes ('cenc' and 'cens' based on CTR and 'cbc1' and 'cbcs' based on CBC) are defined in [3] and allow to signal which part of the stream of coded media data, i.e. NAL units associated with the Video Coding Layer (VCL) according to [6], constitute the plaintext and are hence encrypted. FIG. 2 illustrates the succession of NAL units associated to one sample (i.e. for instance a video picture consisting of two tiles, each in a separate NAL unit) in the coded media data as well as the structure of a video slice consisting of a header and an entropy coded payload. The latter is referred to as Video Slice Data in the figure. The ISO Media Size Header describes the length of the NAL unit (NALU) and is sometimes referred to as Part 15 NAL size header in the following. The Video Slice Data (or slice payload) usually constitutes the largest part of the coded data stream.

As mentioned above the various coding and prediction dependencies in coded video allow to encrypt only a fraction of all samples (e.g. every other sample or even, in the so-called pattern encryption schemes tens' and 'cbcs', every other plaintext block or another signaled ratio) and still maintain a good protection of content, which saves processing power. Furthermore, it may be beneficial to leave parts of the media data unencrypted, specifically the NAL unit header or the slice header, which do not include coded pixel values but control information that might be useful on the system layer for handling of the stream of encrypted media data, e.g. for the purpose of rewriting a coded media data stream to HEVC Annex B byte stream format. Therefore, the subsample encryption formats in [3] mandates to leave certain portions unencrypted, e.g. the NAL unit and slice headers. Depending on the encryption scheme, partial plaintext blocks at the end of a subsample are handled differently. In CTR based scheme 'cenc', plaintext blocks may span over subsample boundaries, while in the CBC based scheme 'cbcs', partial plaintext blocks at the end of subsamples remain either unencrypted. In the schemes tens' and 'cbc1', the range of unencrypted bytes at the subsample start is selected appropriately so that no partial plaintext block occurs In Tile-Based Video Streaming applications such as defined by the Omnidirectional Media Format (OMAF) [7], the video pictures within a client side video data stream may be divided into tiles that depict parts or areas of the video at different resolution or quality than others in a user-dependent fashion. This allows to concentrate the relevant system resources (network throughput or video decoder pixel throughput) on video areas that are in the center of user attention, e.g. areas that represent content in the user viewing direction within a 360° video streaming application.

Such content is often delivered using well established HTTP based streaming formats, e.g. MPEG DASH [8] where coded media data exists on HTTP servers in segmented FF containers and is advertised by offering a downloadable XML description of the available segments, i.e. the Media Presentation Description (MPD), that is further structured into Adaptation Sets (individual media content pieces, e.g. tiles) and Representations (varying bitrate variants of the same content pieces). Sub-pictures or tiles of a 360° video can be offered as Adaptation Sets while other Set of Adaptation Sets describes a (viewport-dependent mixed-resolution) composition of the individual sub-pictures or tiles through so called FF extractor tracks. These FF extractor tracks reference the corresponding sub picture tracks through two aggregation concepts, either:

through a concept referred to as dependencyId (FIG. 3, where one extractor track explicitly references the Representations within the Adaptation sets containing the content pieces of the composition, i.e. a specific bitrate variant of the content piece). This means that the exact byte sizes of subsamples extracted by an extractor track when played on client side are known during creation of the extractor track, or through a concept referred to as preselections (FIG. 4, where one extractor track references the content of the composition only on the Adaptation Set level through, leaving the decision on the precise Representation up to the client). This means that the exact byte sizes of subsamples extracted by an extractor track when played on client side are NOT known during creation of the extractor track and only after client download.

As illustrated in FIG. 3, if dependencyId is used to signal all potential combinations of the 2 different tiles in the example at the three different bitrate, 9 representations are signalled in the AdaptationSet 3 (only 6 shown in the figure). All representations need to be made available at the server and extractor tracks for each representation need to be generated. FIG. 4 shows that when using Preselections a single representation is made available in AdaptationSet3 that contains a single extractor track valid to generate a valid bitstream out of any of the 9 possible combinations.

State-of-the-art approaches for encrypted tile-based DASH services that are supported by at least a fraction of platforms are:

MPD uses dependencyId and all sub-pictures/tiles are 'cbcs' encrypted.

MPD uses dependencyId and only an arbitrary single sub-picture/tile is CTR, i.e., 'cenc' or 'cens', encrypted.

However, a wide range of problems arises when such content is to be provided to a wide range of existing platforms, i.e. device ecosystems such as Android or iOS based mobile devices, SmartTVs and Set-Top boxes, browser implementations and so forth, in an encrypted form to achieve digital rights management (DRM):

some platforms may support only CBC based encryption approaches while others may support only CTR based encryption.

tile-based streaming services that use the dependencyId based approach described above involve a relatively verbose and large MPD to be maintained that is unattractive to service operators. The MPD size and complexity in tile-based streaming services can be considerably reduced using the preselections approach described above (see FIG. 3 and FIG. 4 for comparison).

the plaintext in CTR based encryption schemes is constituted from a concatenation of all subsample/tiles payload data of a sample which prohibits tile-based approaches in which the order or bitrate (byte size) of tiles within the picture is subject to change.

As evident from the range of problems above, the existing encryption schemes do not allow to achieve DRM in context of tile-based video streaming today.

A further aspect the present application is concerned with is related to omnidirectional video and its handling in case of a video quality varying across the scene. The quality of the omnidirectional video can vary from region to region. In order to describe the spatial differences of the quality, Omnidirectional MediA Format (OMAF) specifies signalling methods for both: ISOBMFF and DASH. In case of ISOBMFF the region-wise quality differences can be indicated by using the SphereRegionQualityRankingBox (see FIG. 5a) or 2DRegionQualityRankingBox (see FIG. 5b) in a visual sample entry.

Both boxes allow for signaling the relative quality differences for different regions of the omnidirectional video by specifying a value for the quality_ranking attributes. When a quality_ranking value of the region A is smaller than the value of the region B, the region A has a higher quality of the region B.

In order to signal the relative quality differences of different regions in DASH, OMAF defines a region-wise quality descriptor, which uses the SupplementalProperty element with a @schemeIdUri attribute equal to "urn:mpeg:omaf:rwqr:2017" and a @value as a comma separated list of values as specified in the table below:

| @value parameter for RWQR descriptor | Use | Description |
| --- | --- | --- |
| shape_type | M | Value 0 specifies that the region is indicated through four great rectangles as specified in clause 7.3. Value 1 specifies that the region is indicated through two yaw and two pitch circles as specified in clause 7.3. |
| quality_ranking | M | specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B. |
| view_idc | M | 0 indicates that the content is monoscopic, 1 indicates that the region is on the left view of stereoscopic content, 2 indicates that the region is on the right view of stereoscopic content, 3 indicates that the region is on both the left and right views. |
| remaining_area_flag | M | Value 0 specifies that center_yaw, center_pitch, center_roll, hor_range, and ver_range are present. Value 1 specifies that the region is the area not covered by any other regions defined by RWQR descriptors included in the same element. remaining_area_flag shall not be equal to 1 in more than one RWQR descriptor in the same element. |
| center_yaw | CM | Specifies the yaw of the center point the region in degrees relative to the global coordinate axes. |
| center_pitch | CM | Specifies the pitch of the center point the region in degrees relative to the global coordinate axes. |
| center_roll | CM | Specifies the roll angle for the region. |
| hor_range | CM | Specifies the horizontal range of the region through the center point of the region. |

| @value parameter for RWQR descriptor | Use | Description |
|---|---|---|
| ver_range | CM | Specifies the vertical range of the region through the center point of the region. |

This descriptor shall appear on the adaptation set level and shall not be present in other levels. For example: if two tiles are encoded with two different resolutions (High resolution & Low resolution), each of those tiles can be described with a separate AdaptationSet, as depicted in FIG. 6. Each AdaptationSet might contain different Representations of the same tile, encoded with different bitrates. Each Representation might also contain an optional attribute @qualityRanking, which specifies a quality ranking of the current Representation relative to other Representations in the same AdaptationSet (lower values represent higher quality). The Representations in AdaptationSet 3 (and AdaptationSet 6) contain an extractor track that allows any combination of one Representation among the AdaptationSet 1 and one representation of AdaptationSet 2 (or AdaptationSet 4 and AdaptationSet 5 respectively).

When the client selects an AdaptationSet 3 or 6 that correspond to a viewport dependent solution, it would be desirable to provide a description of the region-wise quality in order to understand where the focus of the content lies. In the given example we would have two regions, one containing a high resolution with a value of quality_ranking=1, and one containing a low resolution with quality_ranking=2 (or any other number that indicate that higher resolution regions have a higher quality).
<SupplementalProperty schemeIdUri="urn:mpeg:omaf:rwqr:2017" value="1, 1, 0, 0, 90, 0, 0, 180, 180">
<SupplementalProperty schemeIdUri="urn:mpeg:omaf:swqr:2017" value="1, 2, 0, 1">

Thus, a user would instantaneously understand where is the focus of the viewport dependent representation is located when choosing that AdaptationSet. However, when the Preselections are used on the AdaptationSet level, the possible combinations of the corresponding Representations are not defined and any Representation from the corresponding AdaptationSet can be used (while at the same time @qualityRanking attributes in those Representations might be present). The @qualityRanking values might contradict with the values specified by the region-wise quality descriptor.

SUMMARY

An embodiment may have an apparatus for downloading an ROI-specific video stream by tile-based video streaming configured to inspect a manifest file so as to, depending on a region of interest, identify and download a set of bit streams along with an extractor, the set of bitstreams having encoded thereinto different portions of a video picture area; compile, using the extractor, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and decrypt a coding payload section of each subpicture portion of a subset of one or more of the subpicture portions of the compiled bitstream by using block-wise decryption by use of sequential variation of a plaintext mask and/or block-decryption key by reinitializing the sequential variation for each subpicture portion to be decrypted and finding a border of the coding payload section of each subpicture portion to be decrypted by parsing the coding payload section of the respective subpicture portion up to a currently decrypted position and/or deriving a length of the coding payload section of the respective subpicture portion from a header within the respective subpicture portion, and/or using a bitstream length or pointer indication signaled within the bitstream from which the picture portion is extracted which the respective subpicture portion belongs to.

Another embodiment may have an apparatus for recovering a video stream from a set of bit streams and an extractor file, the set of bitstreams having encoded thereinto different portions of a video picture area, the apparatus configured to compile, using the extractor file, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and decrypt a coding payload section of each subpicture portion of a subset of one or more of the subpicture portions of the compiled bitstream by using block-wise decryption by use of sequential variation of a plaintext mask and/or block-decryption key by reinitializing the sequential variation for each subpicture portion to be decrypted and finding a border of the coding payload section of each subpicture portion to be decrypted by parsing the coding payload section of the respective subpicture portion up to a currently decrypted position and/or deriving a length of the coding payload section of the respective subpicture portion from a header within the respective subpicture portion, and/or using a bitstream length or pointer indication signaled within the bitstream from which the picture portion is extracted which the respective subpicture portion belongs to.

Another embodiment may have an apparatus for recovering a video stream from a bitstream which includes sub-picture portions for different portions of a video picture area, wherein the apparatus is configured to decrypt a coding payload section of each subpicture portion of a subset of one or more of the subpicture portions of the bitstream by using block-wise decryption by use of sequential variation of a plaintext mask and/or block-decryption key by reinitializing the sequential variation for each subpicture portion to be decrypted and finding a border of the coding payload section of each subpicture portion to be decrypted by parsing the coding payload section of the respective subpicture portion up to a currently decrypted position and/or deriving a length of the coding payload section of the respective subpicture portion from a header within the respective subpicture portion, and/or using a bitstream length or pointer indication signaled from outside for the respective subpicture portion.

According to another embodiment, a collection of data for downloading an ROI-specific video stream by tile-based video streaming may have: bit streams each having encoded thereinto one of portions of a video picture area, so that each portion of the video picture area is encoded into a subset of the bit streams at different qualities; at least one extractor associated with an ROI of the video picture area; a manifest file identifying, for the predetermined ROI, a set of bit streams having encoded thereinto different portions of a video picture area which focus on the ROI, wherein the extractor indicates a compilation of a compiled bitstream out of the set of bitstreams by identifying, for each of the subsets of bitstreams, out of a selected bitstream of the respective subset of bitstreams, a picture portion relating to a current picture frame and signaling a compilation of the compiled bitstream out of the identified picture portions so that the compiled bitstream includes a sub-picture portion for the picture portion of the selected bitstream of each of the subsets of bitstreams the compiled bitstream is formed of; and wherein a coding payload section of the picture portion of each bitstream of each subset of bitstreams out of an encrypted set of one or more of the subsets of bitstreams is encrypted by using block-wise encryption by use of sequential variation of a plaintext mask and/or block-encryption key by reinitializing the sequential variation for each picture portion.

According to another embodiment, a video stream may have: a set of bit streams and an extractor, the set of bitstreams having encoded thereinto different portions of a video picture area, wherein the extractor indicates a compilation of a compiled bitstream out of the set of bitstreams by identifying, for each of the set of bitstreams, a picture portion relating to a current picture frame and signaling a compilation of the compiled bitstream out of the identified picture portions so that the compiled bitstream includes a sub-picture portion for the picture portion of each of the set of bitstreams the compiled bitstream is formed of; and wherein a coding payload section of the picture portion of each bitstream out of an encrypted set of one or more of the set of bitstreams is encrypted by using block-wise encryption by use of sequential variation of a plaintext mask and/or block-encryption key by reinitializing the sequential variation for each picture portion.

Another embodiment may have an apparatus for downloading an ROI-specific video stream by tile-based video streaming, configured to inspect a manifest file so as to, depending on an ROI, identify and download a set of bit streams along with an extractor file, the set of bitstreams having encoded thereinto mutually different portions of a video picture area; compile, using the extractor file, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and identify a predetermined subpicture portion out of the subpicture portions of the compiled bitstream on the basis of signaling in at least one of the extractor file or the sub-picture portions, decrypt a coding payload section of the predetermined subpicture portion of the subpicture portions of the compiled bitstream by finding a border of the coding payload section of the predetermined subpicture portion to be decrypted by parsing the coding payload section up to a currently decrypted position and/or deriving a length of the coding payload section from a header within the one predetermined subpicture portion, and/or using a bitstream length or pointer indication signaled within the bitstream from which the picture portion is extracted which the predetermined subpicture portion belongs to.

Another embodiment may have an apparatus for recovering a video stream from a set of bitstreams and an extractor file, the set of bitstreams having encoded thereinto different portions of a video picture area, the apparatus configured to compile, using the extractor file, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and identify a predetermined subpicture portion out of the subpicture portions of the compiled bitstream on the basis of signaling in at least one of the extractor file or the sub-picture portions, decrypt a coding payload section of the predetermined subpicture portion of the subpicture portions of the compiled bitstream by finding a border of the coding payload section of the predetermined subpicture portion to be decrypted by parsing the coding payload section up to a currently decrypted position and/or deriving a length of the coding payload section from a header within the one predetermined subpicture portion, or using a bitstream length or pointer indication signaled within the bitstream from which the picture portion is extracted which the predetermined subpicture portion belongs to.

Another embodiment may have an apparatus for recovering a video stream from a bitstream which includes sub-picture portions for different portions of a video picture area, wherein the apparatus is configured to identify a predetermined subpicture portion out of the subpicture portions of the bitstream on the basis of signaling inbound from outside or signaling in the sub-picture portions, decrypt a coding payload section of the predetermined subpicture portion of the subpicture portions of the bitstream by finding a border of the coding payload section of the predetermined subpicture portion to be decrypted by parsing the coding payload section up to a currently decrypted position and/or deriving a length of the coding payload section from a header within the predetermined subpicture portion, and/or using a bitstream length or pointer indication signaled from outside for the predetermined subpicture portion.

According to another embodiment, a collection of data for downloading an ROI-specific video stream by tile-based video streaming may have: bit streams each having encoded thereinto one of portions of a video picture area, so that each portion of the video picture area is encoded into a subset of the bit streams at different qualities; at least one extractor file associated with an ROI of the video picture area; a manifest file identifying, for the predetermined ROI, a set of bit streams having encoded thereinto different portions of a video picture area which focus on the ROI, wherein the extractor file indicates a compilation of a compiled bitstream out of the set of bitstreams by identifying, for each of the subsets of bitstreams, out of a selected bitstream of the respective subset of bitstreams, a picture portion relating to a current picture frame and signaling a compilation of the compiled bitstream out of the identified picture portions so that the compiled bitstream includes a sub-picture portion for the picture portion of the selected bitstream of each of the subsets of bitstreams the compiled bitstream is formed of; and a predetermined subpicture portion is identified out of the subpicture portions of the compiled bitstream by identifying a predetermined subset of bitstreams out of the subsets of bitstreams so that the picture portion of the selected bitstream of the predetermined subset of bitstreams is the predetermined subpicture portion and by signaling contained in at least one of the extractor file or the sub-picture portions, wherein a coding payload section of the picture portion of the bitstreams of the predetermined subset of bitstreams is encrypted.

According to another embodiment, a video stream may have: a set of bit streams and an extractor file, the set of bitstreams having encoded thereinto different portions of a video picture area, wherein the extractor file indicates a compilation of a compiled bitstream out of the set of bitstreams by identifying, for each of the set of bitstreams, a picture portion relating to a current picture frame and signaling a compilation of the compiled bitstream out of the identified picture portions so that the compiled bitstream includes a sub-picture portion for the picture portion of each of the set of bitstreams the compiled bitstream is formed of; and a predetermined subpicture portion is identified out of the subpicture portions of the compiled bitstream by signaling contained in at least one of the extractor file or the sub-picture portions, wherein a coding payload section of the predetermined subpicture portion is encrypted.

According to another embodiment, a manifest file may have: first parameter sets each defining one of picture-portion specific adaptation sets of representations, the representations of each picture-portion specific adaptation set having encoded thereinto one of different picture portions at different qualities, wherein each first parameter set includes a quality level for each representation of the picture-portion specific adaptation set defined by the respective first parameter set; at least one second parameter set defining a preselection adaptation set which assigns to each of regions of an output picture area one of the picture-portion specific adaptation sets, wherein the at least one second parameter set includes one or more parameters for each region of the output picture area, indicating a quality level range covering the quality levels of the representations of the picture-portion specific adaptation set assigned to the respective region, and/or the manifest file includes an indication whether the quality levels indicated by the first parameter sets are defined on a common ordinal scale so as to be ordinally scaled across different ones of the first parameter sets, or the quality levels indicated by the first parameter sets are defined on separate ordinal scales, individual for the first parameter sets; and/or the at least one second parameter set includes one or more parameters indicating, for each region of the output picture area, a quality level hint for the respective region and an indication whether the quality level hint for the respective region and the quality levels defined by the first parameter set of the picture-portion specific adaptation set assigned to the respective region, are defined on a common ordinal scale so as to be ordinally scaled thereacross, or the quality level hint and the quality levels defined by the first parameter set of the picture-portion specific adaptation set assigned to the respective region are defined on separate ordinal scales, and/or the at least one second parameter set includes one or more parameters indicating, for the regions of the output picture area, quality ranking among the regions.

Another embodiment may have a client device configured to inspect a first inventive manifest file and change, based on the quality level range and/or the indication, a streaming strategy in adaptively streaming a video from a server.

According to another embodiment, a manifest file may have: a first parameter set for a region-wise compiled adaptation set defining a set of representations coinciding in a subdivision of a video picture area in regions, the representations having encoded thereinto the regions of video picture area at different quality level tuples assigning a region-specific quality level to each region, the first parameter set having an adaptation set quality level indication for all regions, and for each representation, a representation-specific quality level indication wherein, for each representation, the quality level tuple of the respective representation is derivable from a combination of the adaptation set quality level indication and the representation-specific quality level indication for the respective representation.

Another embodiment may have a client device configured to inspect the second inventive manifest file and use the quality level tuples of the representations in a streaming strategy for adaptively streaming a video from a server.

Another embodiment may have a file format descriptor for an extractor which indicates a compilation of a compiled bitstream out of subsets of bitstreams each associated with a different one of portions of a video picture area, with leaving freedom to select for each portion one bitstream out of the associated subset of bitstreams, wherein the file format includes one or more parameters for each portion of the video picture area, indicating a quality level range covering quality levels signaled in the representations of the subset of representations assigned to the respective portion, or quality offsets between the quality levels signaled by the representations of different ones of the subsets of representations sets, and/or includes an indication whether quality levels indicated in the representations are defined on a common ordinal scale so as to be ordinally scaled across different ones of the representations of different subsets, or the quality levels indicated by the representations are defined on separate ordinal scales, individual for the subsets; and/or includes one or more parameters indicating, for each portion of the output picture area, a quality level hint for the respective portion and an indication whether the quality level hint for the respective portion and the quality levels indicated in the representations included by the subset associated with the respective portion, are defined on a common ordinal scale so as to be ordinally scaled thereacross, or the quality level hint and the quality levels indicated in the representations included by the subset associated with the respective portion are defined on separate ordinal scales, and/or includes one or more parameters indicating, for the portions of the output picture area, quality ranking among the portions.

According to another embodiment, a method for downloading an ROI-specific video stream by tile-based video streaming may have the steps of: inspecting a manifest file so as to, depending on a region of interest, identify and download a set of bit streams along with an extractor, the set of bitstreams having encoded thereinto different portions of a video picture area; compiling, using the extractor, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and decrypting a coding payload section of each subpicture portion of a subset of one or more of the subpicture portions of the compiled bitstream by using block-wise decryption by use of sequential variation of a plaintext mask and/or block-decryption key by reinitializing the sequential variation for each subpicture portion to be decrypted and finding a border of the coding payload section of each subpicture portion to be decrypted by parsing the coding payload section of the respective subpicture portion up to a currently decrypted position and/or deriving a length of the coding payload section of the respective subpicture portion from a header within the respective subpicture portion, and/or using a bitstream length or pointer indication signaled within the bitstream from which the picture portion is extracted which the respective subpicture portion belongs to.

According to another embodiment, a method for recovering a video stream from a set of bit streams and an extractor file, the set of bitstreams having encoded thereinto different portions of a video picture area, may have the steps of: compiling, using the extractor file, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and decrypting a coding payload section of each subpicture portion of a subset of one or more of the subpicture portions of the compiled bitstream by using block-wise decryption by use of sequential variation of a plaintext mask and/or block-decryption key by reinitializing the sequential variation for each subpicture portion to be decrypted and finding a border of the coding payload section of each subpicture portion to be decrypted by parsing the coding payload section of the respective subpicture portion up to a currently decrypted position and/or deriving a length of the coding payload section of the respective subpicture portion from a header within the respective subpicture portion, and/or using a bitstream length or pointer indication signaled within the bitstream from which the picture portion is extracted which the respective subpicture portion belongs to.

According to another embodiment, a method for recovering a video stream from a bitstream which includes sub-picture portions for different portions of a video picture area may have the steps of: decrypting a coding payload section of each subpicture portion of a subset of one or more of the subpicture portions of the bitstream by using block-wise decryption by use of sequential variation of a plaintext mask and/or block-decryption key by reinitializing the sequential variation for each subpicture portion to be decrypted and finding a border of the coding payload section of each subpicture portion to be decrypted by parsing the coding payload section of the respective subpicture portion up to a currently decrypted position and/or deriving a length of the coding payload section of the respective subpicture portion from a header within the respective subpicture portion, and/or using a bitstream length or pointer indication signaled from outside for the respective subpicture portion.

According to another embodiment, a method for downloading an ROI-specific video stream by tile-based video streaming may have the steps of: inspecting a manifest file so as to, depending on an ROI, identify and download a set of bit streams along with an extractor file, the set of bitstreams having encoded thereinto mutually different portions of a video picture area; compiling, using the extractor file, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and identifying a predetermined subpicture portion out of the subpicture portions of the compiled bitstream on the basis of signaling in at least one of the extractor file or the sub-picture portions, decrypting a coding payload section of the predetermined subpicture portion of the subpicture portions of the compiled bitstream by finding a border of the coding payload section of the predetermined subpicture portion to be decrypted by parsing the coding payload section up to a currently decrypted position and/or deriving a length of the coding payload section from a header within the one predetermined subpicture portion, and/or using a bitstream length or pointer indication signaled within the bitstream from which the picture portion is extracted which the predetermined subpicture portion belongs to.

According to another embodiment, a method for recovering a video stream from a set of bitstreams and an extractor file, the set of bitstreams having encoded thereinto different portions of a video picture area, may have the steps of: compiling, using the extractor file, a compiled bitstream out of the set of bitstreams by extracting, from each of the set of bitstreams, a picture portion relating to a current picture frame by parsing the respective bitstream and forming the compiled bitstream out of the extracted picture portions so that the compiled bitstream includes a sub-picture portion for the picture portion of each of the set of bitstreams the compiled bitstream is formed of; and identifying a predetermined subpicture portion out of the subpicture portions of the compiled bitstream on the basis of signaling in at least one of the extractor file or the sub-picture portions, decrypting a coding payload section of the predetermined subpicture portion of the subpicture portions of the compiled bitstream by finding a border of the coding payload section of the predetermined subpicture portion to be decrypted by parsing the coding payload section up to a currently decrypted position and/or deriving a length of the coding payload section from a header within the one predetermined subpicture portion, or using a bitstream length or pointer indication signaled within the bitstream from which the picture portion is extracted which the predetermined subpicture portion belongs to.

According to another embodiment, a method for recovering a video stream from a bitstream which includes sub-picture portions for different portions of a video picture area may have the steps of: identifying a predetermined subpicture portion out of the subpicture portions of the bitstream on the basis of signaling inbound from outside or signaling in the sub-picture portions, decrypting a coding payload section of the predetermined subpicture portion of the subpicture portions of the bitstream by finding a border of the coding payload section of the predetermined subpicture portion to be decrypted by parsing the coding payload section up to a currently decrypted position and/or deriving a length of the coding payload section from a header within the predetermined subpicture portion, and/or using a bitstream length or pointer indication signaled from outside for the predetermined subpicture portion.

According to another embodiment, a method for operating a client device may have the step of: inspecting a first inventive manifest file and changing, based on the quality level range and/or the indication, a streaming strategy in adaptively streaming a video from a server.

According to another embodiment, a method for operating a client device may have the step of: inspecting the second inventive manifest file and using the quality level tuples of the representations in a streaming strategy for adaptively streaming a video from a server.

Another embodiment may have a non-transitory digital storage medium having a computer program stored thereon to perform any of the inventive methods when said computer program is run by a computer.

A first aspect of the present application is concerned with a concept of applying en/decryption to tile-based video streaming. In accordance with a first variant, one or more subsets of bitstreams, each subset relating to a corresponding portion of the video picture area and collecting bitstreams of different qualities, for instance, is subject to encryption so that the compiled bitstream resulting from picking-out from each of these subsets one bitstream by way of an extractor, has for a current picture frame, one encrypted picture portion of the one bitstream out of each encrypted subset. In accordance with this first aspect, the encryption takes place by block-wise encryption and the decryption by block-wise decryption, both by use of sequential variation of a plain text mask and/or block-decryption key, and in particular, the sequential variation is subject to reinitialization for each picture portion which forms a respective sub-picture portion in the compiled bitstream. Accordingly, owing to the reinitialization per sub-picture portion, it does not matter as to which bitstream out of an encrypted subset has been selected for compilation of the compiled bitstream. The length of the picture portion relating to a certain picture frame may vary among a certain subset relating to a certain portion of the picture area without raising problems in the en/decryption. At the client-side, in turn, i.e. at the download side, borders of a coding payload section of encrypted sub-picture portions are detected on the basis of one of the following alternatives: by parsing the coding payload section of such an encrypted sub-picture portion up to a currently decrypted position and/or by deriving a length of the coding payload section of the respective sub-picture portion from a header within the respective sub-picture portion, and/or using a bitstream length or pointer indication signaled within the bitstream from which the picture portion is extracted which the respective sub-picture portion belongs to. In effect, a solution has been found in this manner, to efficiently apply en/decryption to tile-based video streaming environments, namely in that such environments are given the opportunity to also use preselection in order to form the downloaded composed bitstreams.

In accordance with a further variant, en/decryption is applied to tile-based video streaming environments in a manner so that the en/decryption focuses on an identified one of the subsets of bitstreams per current picture frame which circumstance is synonymous to identifying one portion of the video picture area for a current picture frame. The identification is signaled, for instance, in the extractor or the sub-picture portions subject to encryption, itself. Here, en/decryption may be done by use of sequential variation of a plaintext mask and/or block-decryption key or by some other means with advantages lying in the efficient focusing of the en/decryption efforts onto only one of the various portions of the scene.

Another aspect of the present application concerns an efficient manner at which a client in a portioned video streaming environment is given the opportunity to derive an understanding of where certain preselection adaptation set has its ROI and/or to derive a good estimate of the relative ranking among the individual combinational options offered by such a preselection adaptation set in terms of qualities. In accordance with this aspect, in a first variant, a manifest file comprises at least one parameter set defining a preselection adaptation set which assigns to each of regions of an output picture area one of picture-portion specific adaptation sets also defined by respective parameter sets in the manifest file. At least one of the following circumstances applies: the at least one second parameter set comprises one or more parameters for each region of the output picture area, indicating a quality level range covering the quality levels of the representations of the picture-portion specific adaptation set assigned to the respective region so that, at the client-side, these ranges assist in obtaining a better understanding of the qualities varying spatially across the regions of the output picture area, thereby suggesting where the ROI lies, namely where the regions of higher qualities lie, and/or a better understanding of the qualities associated with the various combinational options offered by the respective preselection adaptation set. Additionally or alternatively, the manifest file comprises an indication whether the quality levels indicated by the parameter sets defining the picture-portion specific adaptation sets are defined on a common ordinal scale so as to be ordinally scaled across different ones of the first parameter sets. Thus, a client may inspect the quality levels in the parameter sets of the referenced portion-specific adaptation sets in order to gain information on the location of the ROI in the collation of the regions 214 which yields the output picture area. Additionally or alternatively, a precise understanding of the qualities associated with the various combinational options offered by the preselection adaptation set is thus available. Additionally or alternatively, the preselection adaptation set's parameter set comprises, per region of the output picture area, an own quality hint such as a quality level, and an indication whether the quality hint is on a common scale with the locally defined quality levels comprised by the parameter set of the referenced portion specific adaptation set. As the quality hints are defined in a common parameter set, namely the one of the preselection adaptation set, the are defined on a common scale anyway and enable the client device to locate the ROI associated with the corresponding preselection adaptation set. Additionally, the qualities in the preselection adaptation set's parameter set as well as the qualities in the portion specific adaptation set are defined on a common scale, thereby enabling a precise understanding of the available options of a preselection adaptation set. Additionally or alternatively, the preselection adaptation set's parameter set comprises, per region of the output picture area, an own quality hint such as a quality level using which the client is able to, at least, interpret the preselection adaptation set in terms of spatial distribution of qualities over the collation of the regions, i.e. within the circumference of the output picture area, thereby being able to locate the ROI associated with the corresponding preselection adaptation set. Similarly, in accordance with a corresponding aspect, quality hints are used to interrelate representations of portion wise varying quality, the representations coinciding in highest quality portion location. And even further, a file format descriptor may be provided with like information to achieve similar advantages at reception side.

BRIEF DESCRIPTION OF THE DRAWINGS

Embodiments of the present invention will be detailed subsequently referring to the appended drawings, in which:

FIGS. 5a and 5b shows an example for the sphere region quality ranking box written together with intermediate capital letters or 2D region quality ranking box also written together with intermediate capital letters according to ISOMBMFF;

FIG. 14 shows an example for an RWQR descriptor in accordance with an embodiment of the present application defining quality level ranges;

FIG. 15 shows an example for an RWQR descriptor in accordance with an embodiment using an indication whether or not the quality levels indicated for the representations in the region-specific adaptation sets are defined on a common ordinal scale and are thus, comparable with each other, or not;

FIG. 19 shows a schematic diagram illustrating the usage of quality level range indication in order to improve the quality assessment.

DETAILED DESCRIPTION OF THE INVENTION

Figure 1A:
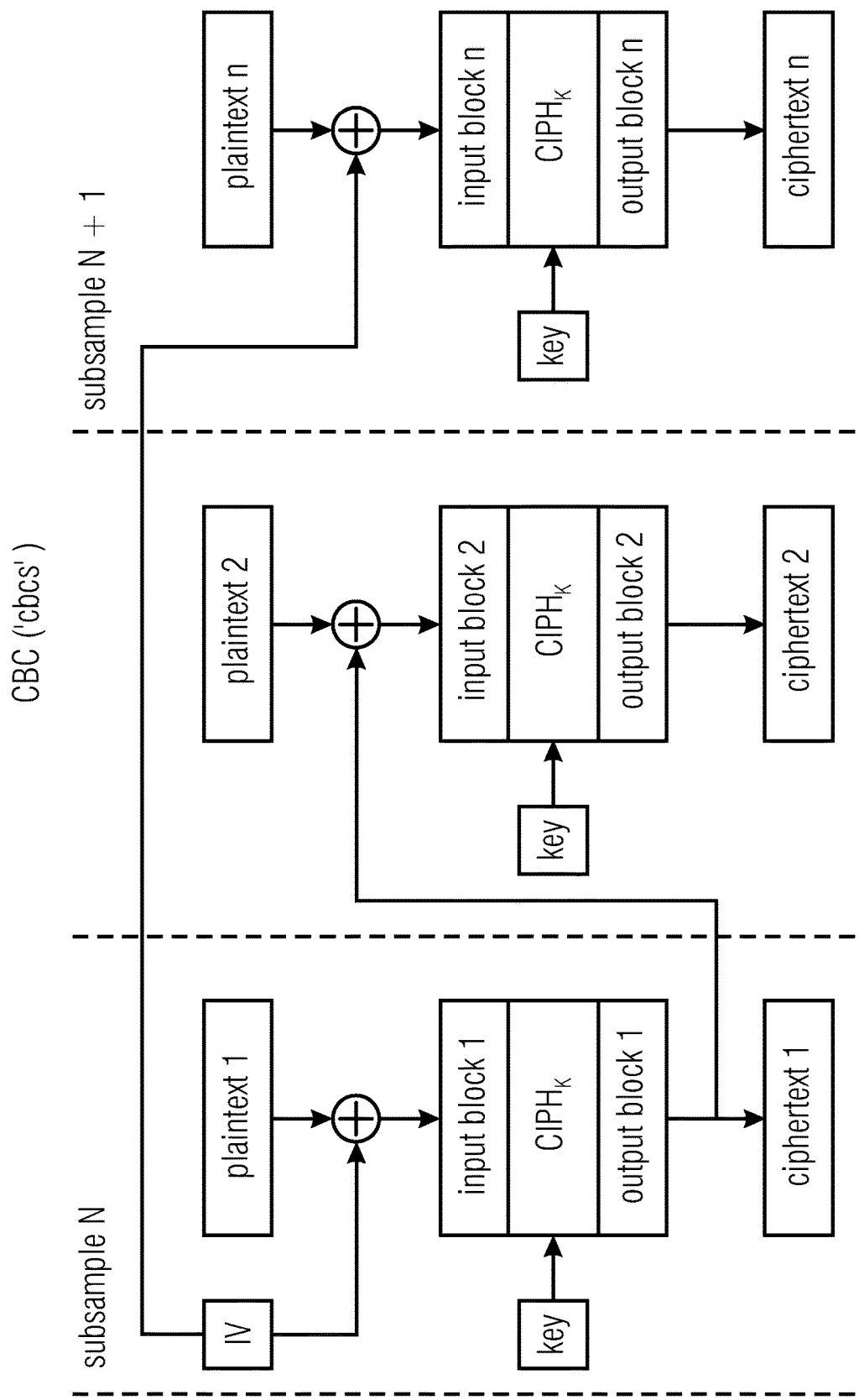
FIG. 1a shows a schematic diagram illustrating the block-wise encryption using cipher block chaining, here exemplarily depicted as being performed in a manner continuing over subsample borders, but subsequent embodiments will render clear that reinitialization per sub-sample may take place.

The following description of embodiments relating to the first aspect of the present application preliminarily resumes the description of the handling of encryption relating to portioned or tile-based video streaming set out above in the introductory portion of the specification. To this end, possible modifications of the known techniques in the environment of MPEG are presented. These modifications, thus, represent embodiments of the first aspect of the present application, and they are abstracted thereinafter as the modifications are not restricted to be used in the MPEG environment, but may be advantageously used elsewhere.

In particular, embodiments described further below enable content media encryption in tile-based video streaming systems across a wider set of available platforms in an efficient manner and overcome the shortcoming of the encryption schemes present in the introductory portion of the specification in this regard. In particular, this encompasses tile-based streaming services with:

CTR based encryption of all sub-pictures
Encrypted media (CTR or CBC) with DASH Preselections A first tool which is used in accordance with a subsequently described modifying embodiment which allows for 'cbcs' all subsample encryption with preselection, is called mandatory subsample identification concept or algorithm in the following. This algorithm allows to make use of CBC based encryption schemes when preselections are used in the MPD. Common encryption [3] offers two ways to identify subsample boundaries and, hence, the byte ranges of encrypted and un-encrypted data as reproduced for reference in the following: A decryptor can decrypt by parsing NAL units to locate video NALs by their type header, then parse their slice headers to locate the start of the encryption pattern, and parse their Part 15 NAL size headers to determine the end of the NAL and matching Subsample protected data range. It is therefore possible to decrypt a track using either (a) this algorithm, i.e. by parsing, ignoring the Sample Auxiliary Information or (b) the Sample Auxiliary Information, ignoring this algorithm.

The Sample Auxiliary Information (SAI) consists of the two boxes 'saiz' and 'saio' defined in [4] that together indicate the location and ranges of the bytes of encrypted and un-encrypted data. However, in a tile-based streaming scenario with preselections, it is not possible to know the bitrate (and hence byte size) of each sub-picture/tile in the resulting client-side bitstream. Hence, it is not possible for the extractor track to include correct SAI beforehand.

Therefore, in accordance with embodiments described herein, it is signalled or mandated in an application format specification such as OMAF that, if present, the incorrect SAI parameters related to clear/protected byte ranges within the extractor track are not to be regarded and instead the above algorithm is to be used for derivation of the location and ranges of the bytes of encrypted and un-encrypted data.

In accordance with a first embodiment, this concept is used along with encrypting the video content portion/tile wise as described in the following.

Figure 3:
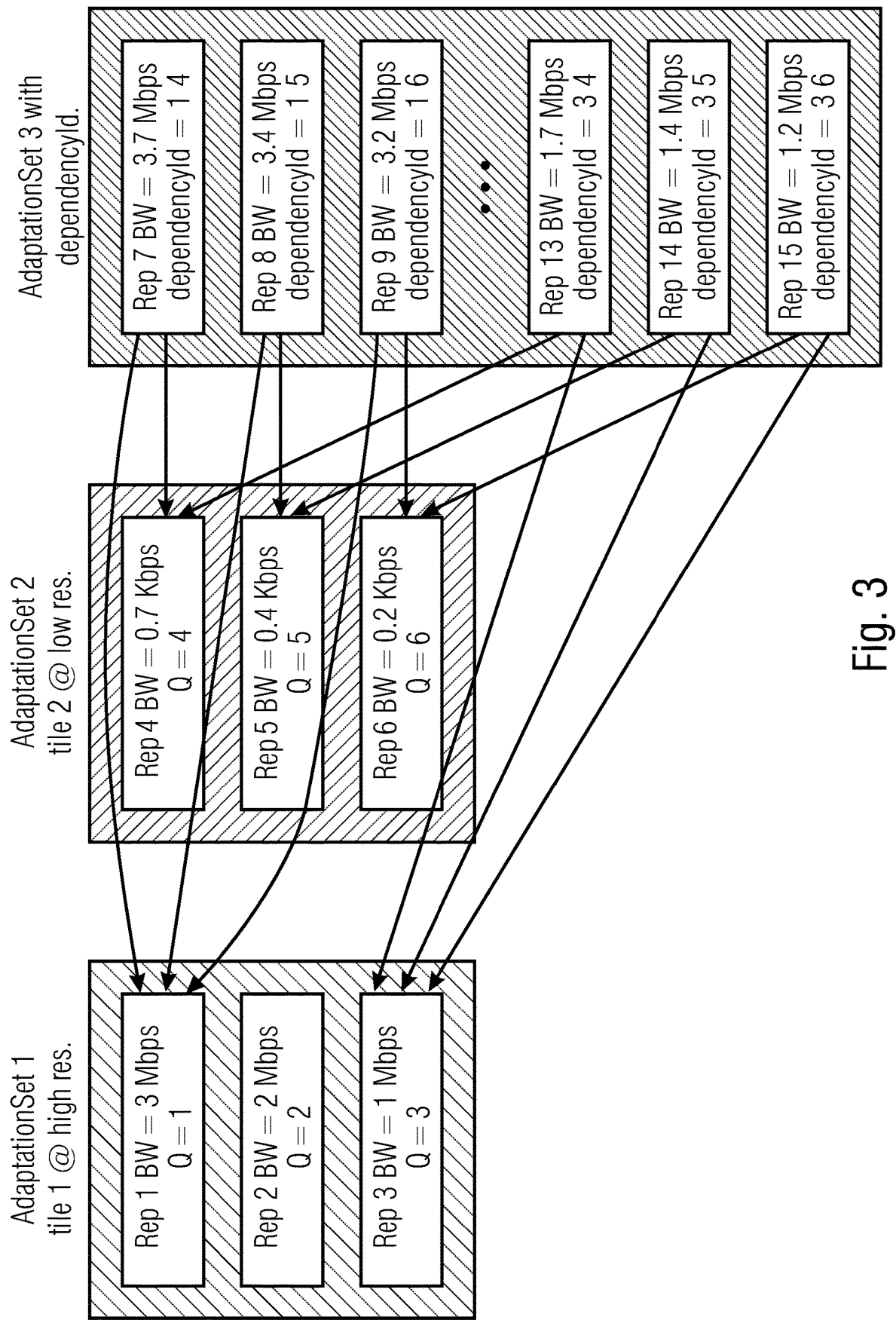
FIG. 3 shows a schematic diagram illustrating representations in a manifest file/MPD (for two tiles at a high resolution and one at a low resolution using dependence ID)
Figure 4:
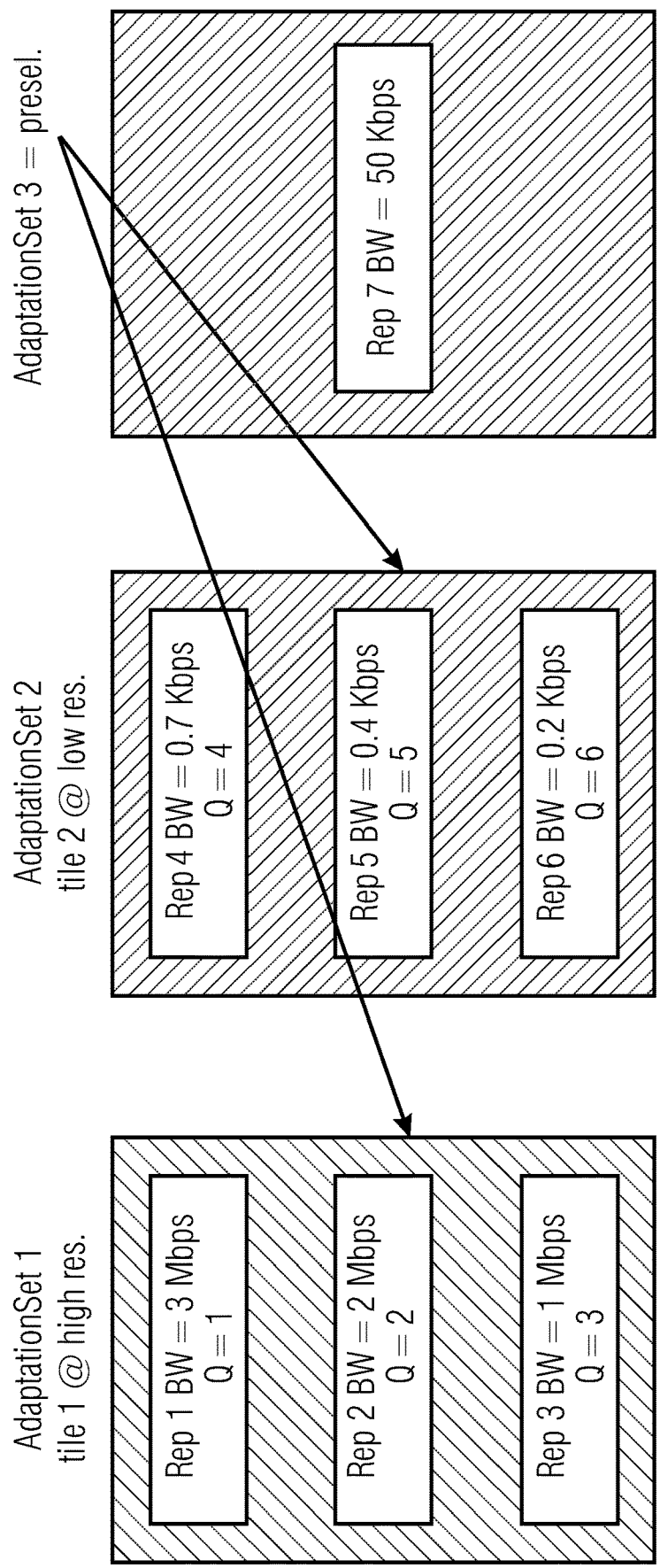
FIG. 4 shows a schematic diagram illustrating representations in a manifest file (MPD) for two tiles, one at high resolution and one at low resolution, using preselections.
Figure 7:
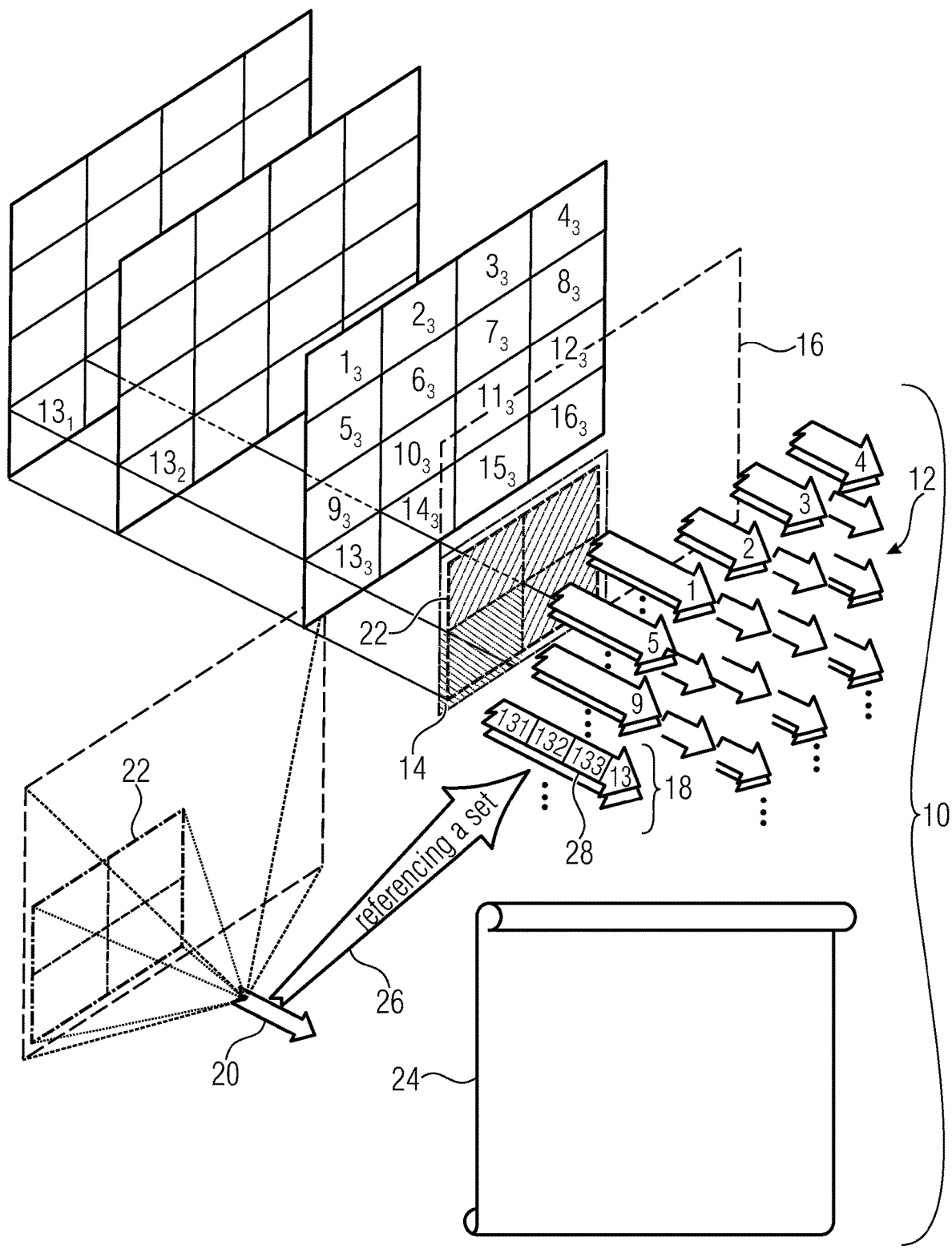
FIG. 7 shows a schematic diagram illustrating the concept of combining en/decryption with tile-based video streaming in accordance with embodiments of the present application.

In particular, FIG. 7 shows a collection of data 10 for downloading an ROI-specific video stream by tile-based video streaming. Embodiments for the actual streaming and embodiments for the entities involved therein are described further below. Data 10 comprises bit streams 12 each having encoded thereinto one of portions 14 of a video picture area 16 which portions may be tiles as taught hereinafter, so that each portion 14 of the video picture area 16 is encoded into a subset 18 of the bit streams 12 at different qualities. The subsets 18, thus, form portion specific subsets 18. These subsets 18 may, in terms of adaptive streaming and the description in the manifest 24, be treated as individual adaptation sets as depicted in FIGS. 3 and 4 where, exemplarily, one adaptation set (thus, forming a subset 18) was present per tile (thus forming a portion 14), each tile forming a tile-specific set of representations (thus forming bit streams 12). In particular, there was exemplarily one adaptation set, AdaptationSet 1, for tile 1 and another adaptation set, AdaptationSet 2, for tile 2. The bit streams 12 may, thus, be treated as representations in the MPD 24 or alternatively speaking, same may be distributed onto different representations.

Figure 8:
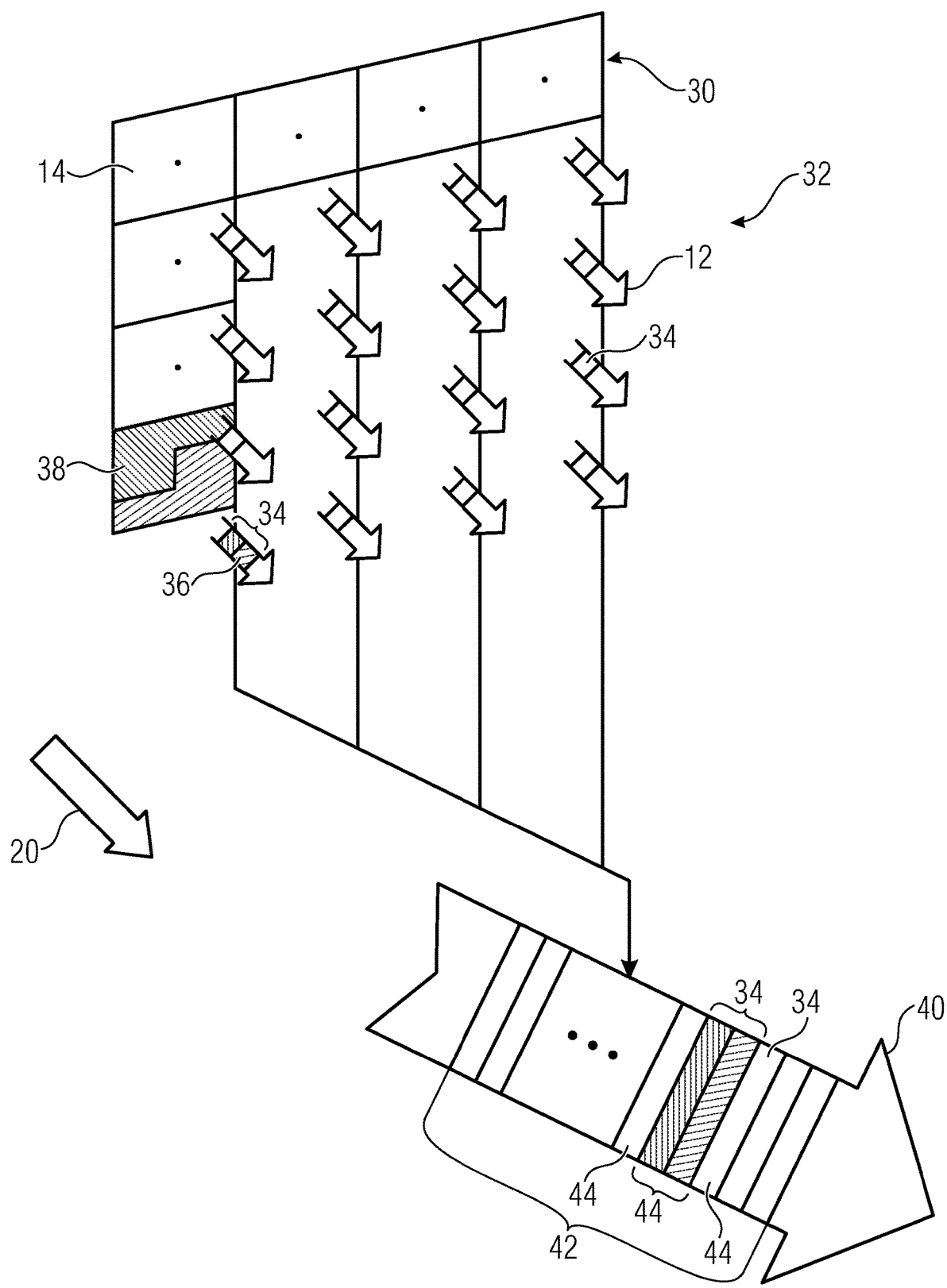
FIG. 8 shows a schematic diagram illustrating the composition of the composed bitstream on the basis of the downloaded bitstreams using the extractor in accordance with an embodiment.

The data 10 further comprises at least one extractor 20, i.e. extractor data or extractor file or extractor track, associated with an ROI 22 of the video picture area, and a manifest file 24. The latter identifies, for the predetermined ROI 22, as illustrated by arrow 26, a set of bit streams 12, the set being composed of one bit stream 12 per subset 18 so as to have encoded thereinto the different portions 14 into which the video picture area 16 is partitioned in a manner focusing on the ROI 22. This focusing is done, for instance, by composing the set such that for subsets 18 within the ROI, the one bit stream out of this subset 18, which contributes to the composed set, is of higher quality compared to subsets 18 pertaining portions 14 outside ROI 22 where the one bit stream selected out of corresponding subsets 18 and comprised by the ROI specific set is of lower quality. The set, thus formed by referencing 26 and indicated by manifest 24, is a ROI specific set of bit streams. An example is depicted in FIG. 8 and will be further discussed below.

Note that the bit streams 12 may, for instance, be formed by M independently coded tiles of N video data streams each having video picture area 16 encoded thereinto in units of these M tiles 14, but at different quality levels. Thus, N times M bit streams would result with FIG. 7 illustrating M=16, with N being, for instance, the number of bit streams 12 per subset 18. The ROI specific set would comprise M bit streams: one out of each subset 18. This is, however, only an example and others would be feasible as well. For instance, N may vary among the M portions 14. The ROI specific set may be composed of merely a subset of the subsets 18 pertaining portions 14 covering, at least, ROI 22.

The bit streams 12 may be stored for on a storage for being downloaded, in pieces and selectively, by a client as taught later on, and might be treated, though, as individual representations in the MPD 24 which is also stored for download by the client and indicates to the client addresses for the download of the bit streams 12. The representations corresponding to bit streams 12 may be, however, by indicated as being not dedicated for being played out individually, i.e. not for play out without being part of a ROI specific set s formed by adaptation set. The extractor 20 is also stored for download by the clients either separately by addresses being indicated in the manifest 24, or along with any of the bit streams such as a track of a media file. In the further description herein, the extractor 20 has also been denoted as FF extractor file. The quality levels which the representations in one subset 18 relate to, may vary in terms of, for instance, SNR and/or spatial resolution and/or colorness.

The extractor file 20 is quasi a constructor for constructing a compiled bit stream out of the ROI specific set. It may be downloaded by the client along with the ROI specific set of bit streams 12. It indicates, by way of pointers and/or construction instructions, a compilation of the compiled bitstream out of the ROI specific set of bitstreams by identifying 26, for each of the subsets 18 of bitstreams, out of the one bitstream of the respective subset 18 of bitstreams, comprised by the ROI specific set, a picture portion relating to a current picture frame and signalling a compilation of the compiled bitstream out of the identified picture portions so that the compiled bitstream comprises a sub-picture portion for the picture portion of the selected bitstream of each of the subsets 18 of bitstreams the compiled bitstream is formed of. In FIG. 7, for instance, three consecutive picture frames are illustrated. FIG. 8 shows one such picture frame 30, the ROI specific set 32 of bit streams 12 and the picture portion 34 in each bit stream of set 32 which relates to the picture frame 30. The picture portions 34 may, as illustrated exemplarily for the bit stream 12 of set 32 relating to portion No. 13, be partitioned, spatially, into one or more than one units such as NAL units 36 each unit encoding a corresponding partition 38 of the portion 14 which the respective picture portion relates to. When composed together according to extractor 20, a composed bit stream 40 results which has an access unit 42—or, speaking in file format domain as used herein elsewhere, a sample for each picture frame such as picture frame 30. Each access units 42 has encoded thereinto the picture area 16 in a spatially varying quality with increased quality within the ROI 22, and subdivided into one sub-picture portion 44 per portion 14, each sub-picture portion 44 formed by the corresponding picture portion 32, i.e. the one which concerns the same portion 14.

Note that in case of preselection which FIG. 4 refers to, the extractor 20 is associated with the ROI, but that this extractor 20 is used to compose different ROI specific sets 32 all of which have increased quality, i.e. select bitstreams of increased quality among the subset 18, within ROI 22. That is, a kind of freedom exist for the client to choose the set 32 for the wanted ROI. In case of defining for ROI 22 in the manifest 24 an adaptation set defining each pair of one specific ROI 22 with one of different ROI specific set 32, which FIG. 3 refers to, the extractor 20 is associated with that ROI and the corresponding ROI specific set 32, specifically, while another extractor 20 might be present which corresponds to another pair of that ROI 22 and another ROI specific set 32 differing to the former set 32 in, for example, in the chosen bitstream 12 in the subsets 18 concerning portions 14 within the ROI and/or in the chosen bitstream 12 in the subsets 18 concerning portions 14 outside the ROI. Besides, as noted below, more than one ROI 22 may be envisaged in data 10, so that for each of these ROIs one or more than one extractor 20 may be present in the data, with the manifest comprising corresponding information.

A coding payload section of the picture portion 34 of each bitstream 12 of each subset 18 of bitstreams, is encrypted by using block-wise encryption by use of sequential variation of a plaintext mask and/or block-encryption key by reinitializing the sequential variation for each picture portion 34. That is, instead of encrypting the coding payload sections of the picture portions 34 of a collection of bit streams, the portions 14 of which together cover the picture area 16 and all belong to the a common picture frame 30, sequentially without reinitializing the sequential variation therebetween such as for the set 32, the encryption is done for each picture portion 34 separately.

It should be noted that the encryption of the coding payload section may be restricted to picture portions 34 of bit streams 12 belonging to any of an "encrypted set" of one or more of the subsets 18 of bitstreams, such as to subsets 18 relating to portions 14 in the mid of picture 16 or subsets 18 relating to every second portion 14 distributed over the area 16 like checkerboard pattern, for instance.

Figure 1B:
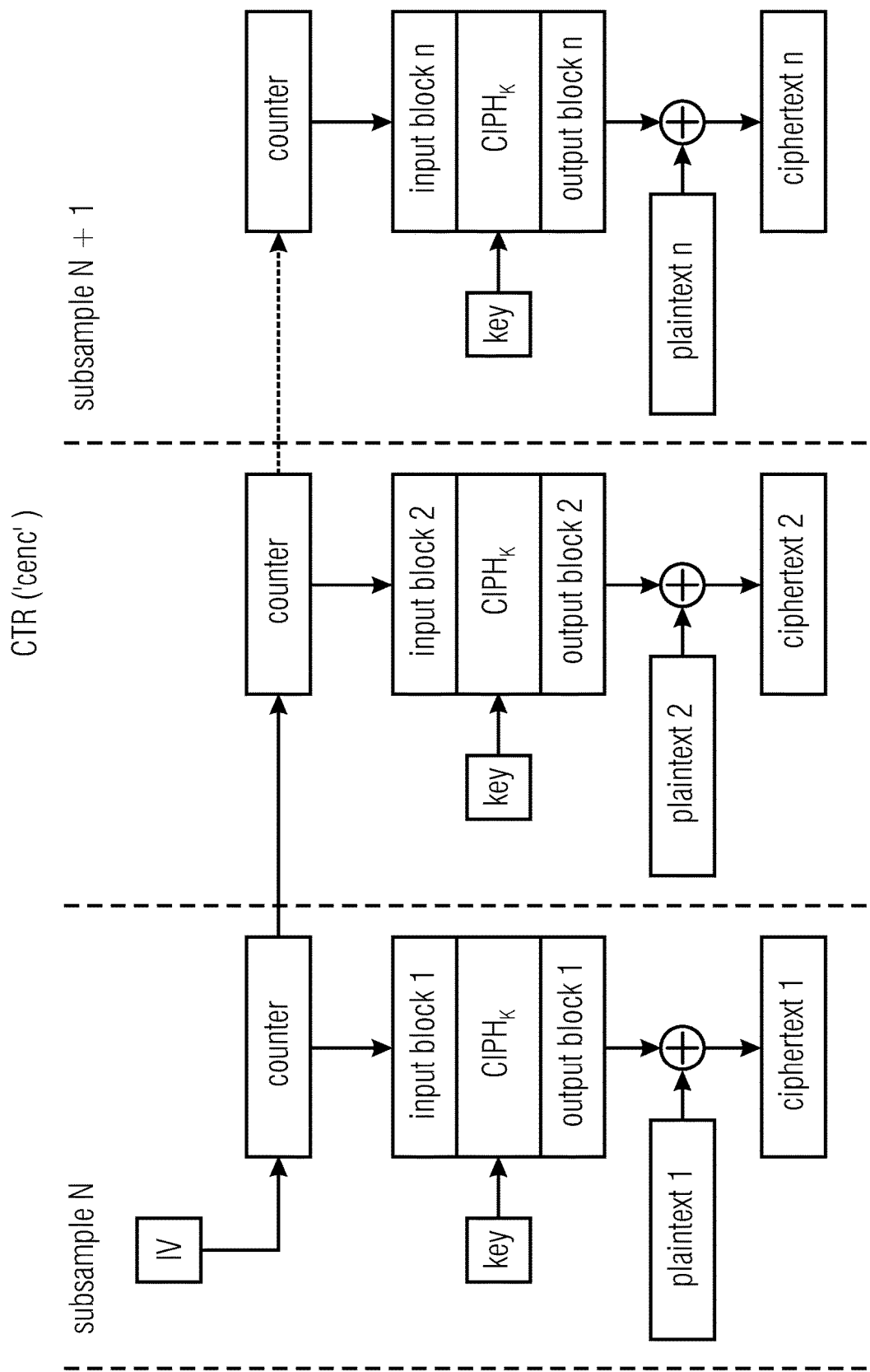
FIG. 1b shows a schematic diagram illustrating block-wise encryption using CTR.
Figure 9:
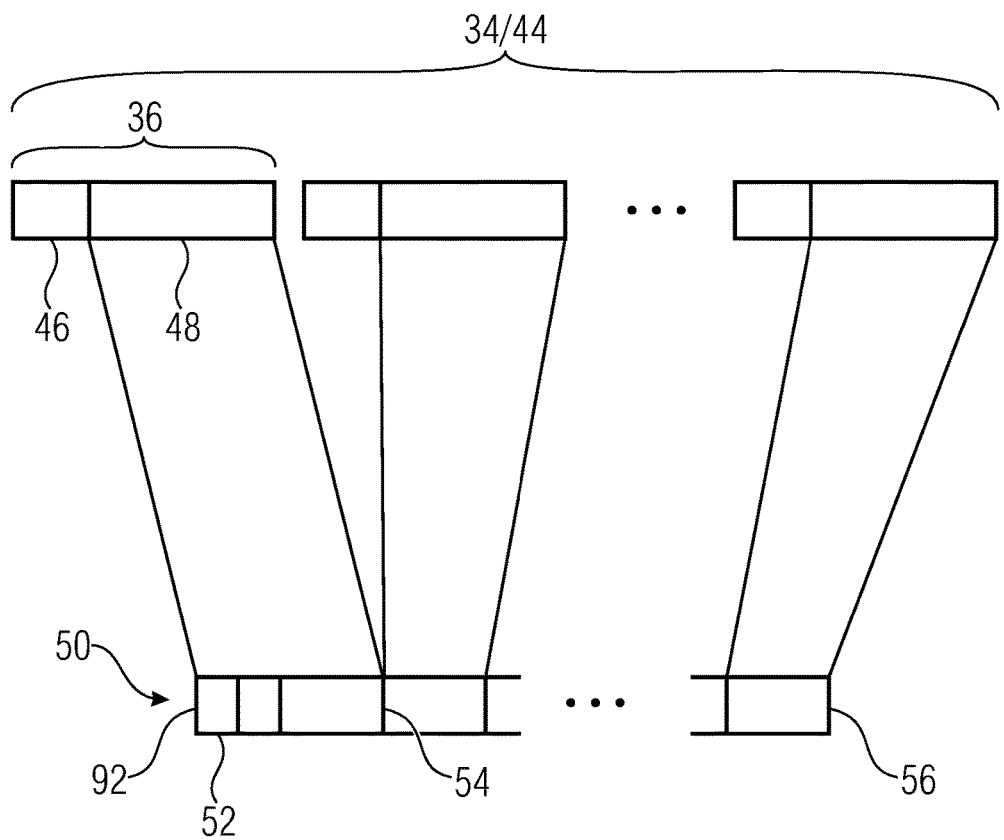
FIG. 9 illustrates the concretization of encrypted coded payload sections of units of a sub-picture portion of the composed bitstream, which is then subject to encryption/decryption, with FIG. 9 illustrating the borders of coded payload sections in the block partitioning associated with the block-wise en/decryption.

FIG. 9, for instance, shows a picture portion 34 which may contribute to a composed bit stream 40. It is exemplarily composed of a sequence of more than one unit 36. Each unit (such as a NAL unit), comprises a header 46 and a payload section 48. The latter may comprise all the prediction parameters and prediction residual related syntax elements having the portion 14 of area 16 encoded thereinto, which corresponds to the picture portion 34, and the former may contain coding settings valid for the whole partition 38 which its payload section 36 encodes such as motion information and residual data. The concatenation 50 of the payload sections 48 of the picture portion 34, which forms a sub-portion 44, in turn, is encrypted. In a deterministic manner, a sequential variation of a plaintext mask and/or a block-decryption key takes place in the block block-wise encryption of concatenation 50. That is, concatenated data 50 is portioned into blocks 52, which were called plaintext blocks. in FIGS. 1*a* and 1*b*, and from one block to the next, an incremental change of cipher (non-linear bijection) input so as to obtain different block-encryption keys for consecutive plaintext blocks in case of CTR takes place. That is, the non-linear function or cipher function, controlled by a certain general key—the function being called CIPH and the general key being called key in FIG. 1*b*—is fed with an increment or counter value, called counter, which changes from one plaintext block to the next, thereby obtaining different en/decryption keys for consecutive blocks which are XORed with the corresponding en/decryption key to obtain the encrypted cipher block, respectively. The intermediate encryption keys (output at "output block #" in FIG. 4 for the successive plaintext blocks "plaintext #" are the same as the decryption keys used for decryption. In CBR, the predecessor cipher block, i.e. the encrypted version of the predecessor block 52, is used as plaintext mask for masking the current plaintext block before the latter is subject to ciphering using the non-linear bijective function. It might be that sections 48 have been generated by an encoder in a manner to have a length corresponding to an integer multiple of a block length of the encryption so that the borders between payload sections 48 coincides with block borders. This is especially advantageous when using the above-mentioned alternating between decryption and parsing algorithm for border detection. In particular, a receiving entity such as the client, need to detect the borders 54 between consecutive payload sections as well as the border 56 at the end of concatenation 50, i.e. the end border of the last payload section, for instance.

Thus, the RIO specific set 32 of bit streams, in its not yet decrypted form, and the extractor 20 together represent an encrypted video stream. The ROI specific set 32 of bitstreams 12 has encoded thereinto the portions 14 of video picture area 16, and the extractor 20 indicates the compilation of the compiled bitstream out of this set 32. The coding payload section 48 of the picture portion 34 of each bitstream 12 out of set 32—or merely of the encrypted set of bitstreams thereamong—is encrypted by using the block-wise encryption using the sequential variation of plaintext mask and/or block-encryption key and by reinitializing the sequential variation for each picture portion.

Figure 10:
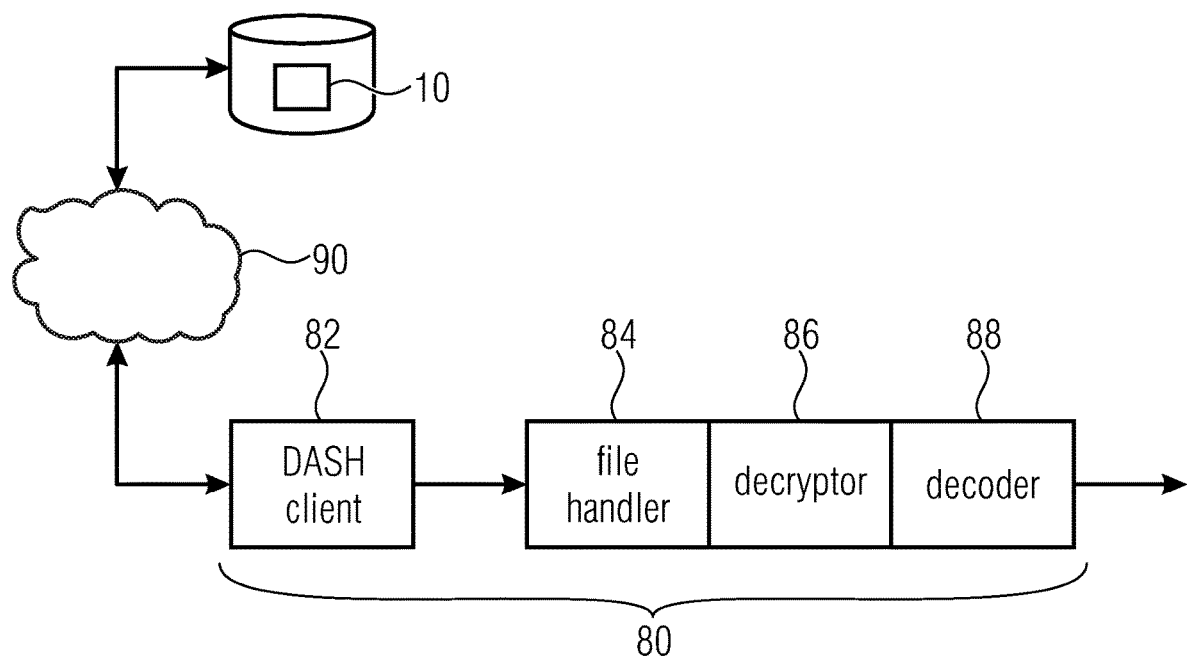
FIG. 10 shows a schematic block diagram of a download apparatus in accordance with an embodiment.

FIG. 10 shows an embodiment for an apparatus 80 for downloading an ROI-specific video stream by tile-based video streaming. The apparatus may, thus, be called a client or client device. As shown, same may be composed of a concatenation of a DASH client 82, a file handler 84, and a decryptor 86, and, optionally, a decoder 88. Note that DASH is merely an example for an adaptive streaming environment. Another may be used as well. File handler 84 and decryptor 86 may operate in parallel or, differently speaking, need not to operate strictly sequentially, and the same applies when considering the file handler 84, the decryptor 86, and the decoder 88*h*. The apparatus is able to handle, i.e. download and decrypt, a video scene prepared as described with respect to FIG. 7 which might, as described, end up in a downloaded composed stream 40 having all sub-samples 44, i.e. all portion 14, encrypted irrespective of the currently envisaged ROI or viewport. Without having mentioned it above, it is clear that the data of FIG. 7 has further extractors 20 for, and has the manifest file 24 indicating bit stream 12 sets 32 for, more than one ROI, namely a set of ROIs distributed over the area 16 so as to be able to follow a view direction of a user in the scene, for instance. The apparatus 80 has access to the data 10 via a network 90 such as the internet, for instance.

The DASH client 82 downloads and inspects the manifest file 24 so as to, depending on an ROI which is currently of interest because of, for instance, the user looking at the corresponding viewport, such as 22 in FIG. 7, identify and download the ROI specific set 32 of bit streams 12 along with the extractor file 20, both being associated with that ROI 22.

The file handler 84 compiles, using the extractor file 20, the compiled bitstream 40 out of the ROI specific set 32 of bitstreams 12 by extracting, from each of these bitstreams, the picture portion 34 relating to a current picture frame 30 by parsing the respective bitstream and forming the compiled bitstream 40 out of the extracted picture portions 34 so that the compiled bitstream 40 is composed of the corresponding sub-picture portions 44, one for each portion 14. Note that at the time of receiving the bitstreams of ROI specific set 32, the picture portions' payload sections are still encrypted. The picture portions are, however, packetized so that the file handler is able to handle them though.

The decryptor 86 decrypts the encrypted coding payload section 48 of each subpicture portion 44 by using block-wise decryption by use of sequential variation of a plaintext mask and/or block-decryption key. To this end, the decryptor 86 reinitializes the sequential variation for each subpicture portion 44 to be decrypted, i.e. at the beginning 92 of concatenation 50 or the start border of the payload section 48 of the first unit 36. It finds the borders 54, 56 of the coding payload section(s) of each subpicture portion 44 to be decrypted by parsing the coding payload section of the respective subpicture portion 44 up to a currently decrypted position or, differently speaking, by alternatingly decrypting and parsing the payload section(s) of concatenation 50.

Figure 11:
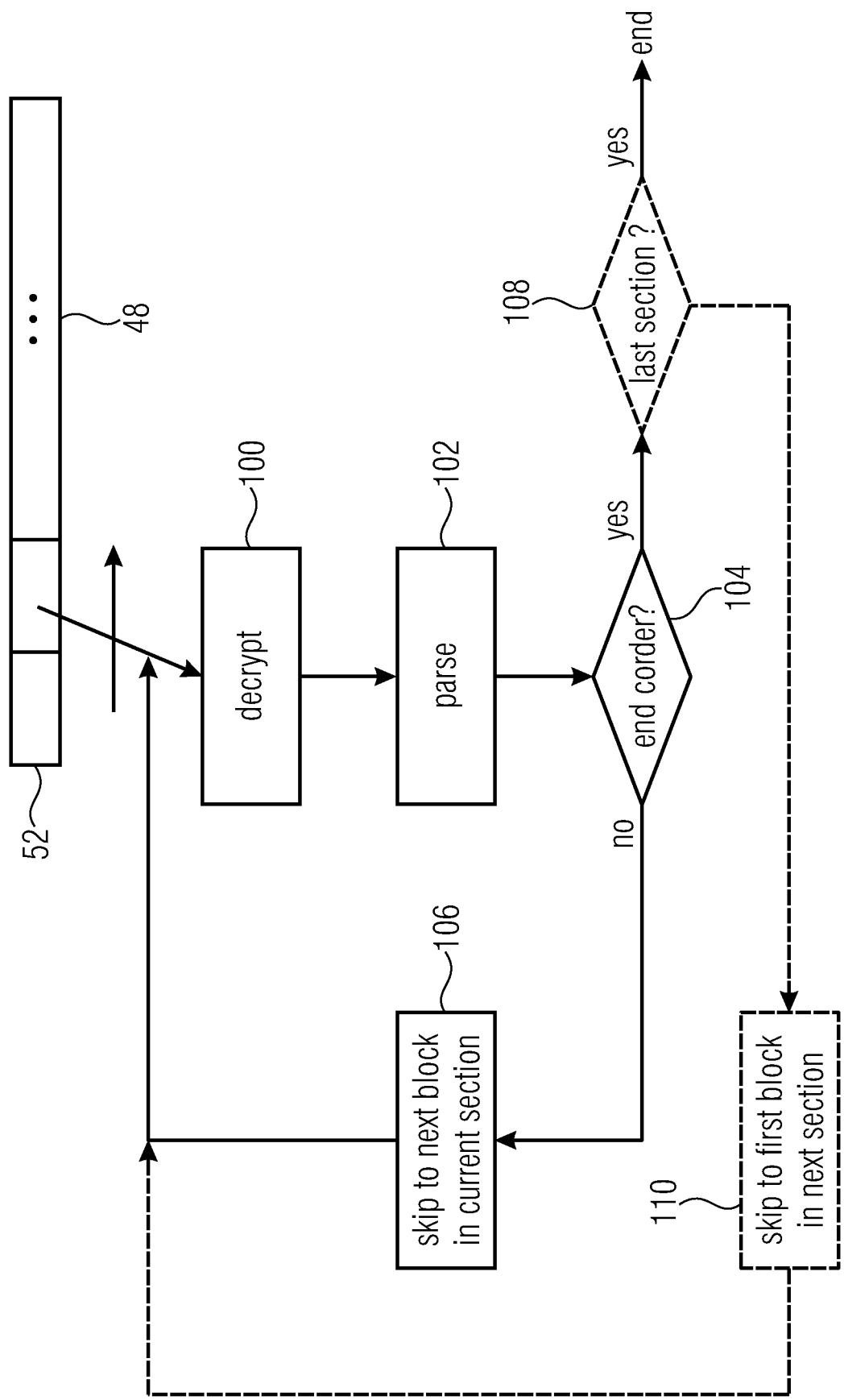
FIG. 11 shows a schematic flow diagram illustrating the process of alternating decryption/passing border detection used in accordance with embodiments of the present application.

See, for instance, FIG. 11 showing that the decryptor, after having initialized the plaintext mask and/or block-decryption key for the sequential variation for the first block of payload data 50, decrypts 100, using e.g. CTR or CBR as described above, a current block to obtain its plaintext version with subsequently parsing 102 the latter, i.e. pursuing the parsing done for the current payload section 48 of the current unit 36 so far up to the currently decrypted block's end. It is checked at 104 if the end of the current block 52 represents the end of the current payload section 48, and if not, the procedure steps 106 to the next block 52 in the current section 48. If yes, however, it is checked whether the end of the last section 48 of the concatenation 50 has been reached at 108, and if yes, the current section's 48 border or end has been found and the procedure is finished for the current subpicture portion 44, and if not, the first block of the next section 48 or next unit 36 is pursued with at 110. It could be that, by default, each picture portion 34 or subpicture portion 44 is merely composed of one unit 36 in which case steps 108 and 110 could be left off. In effect, the procedure finds, by this way, a begin and an end of payload sections 48.

Figure 2:
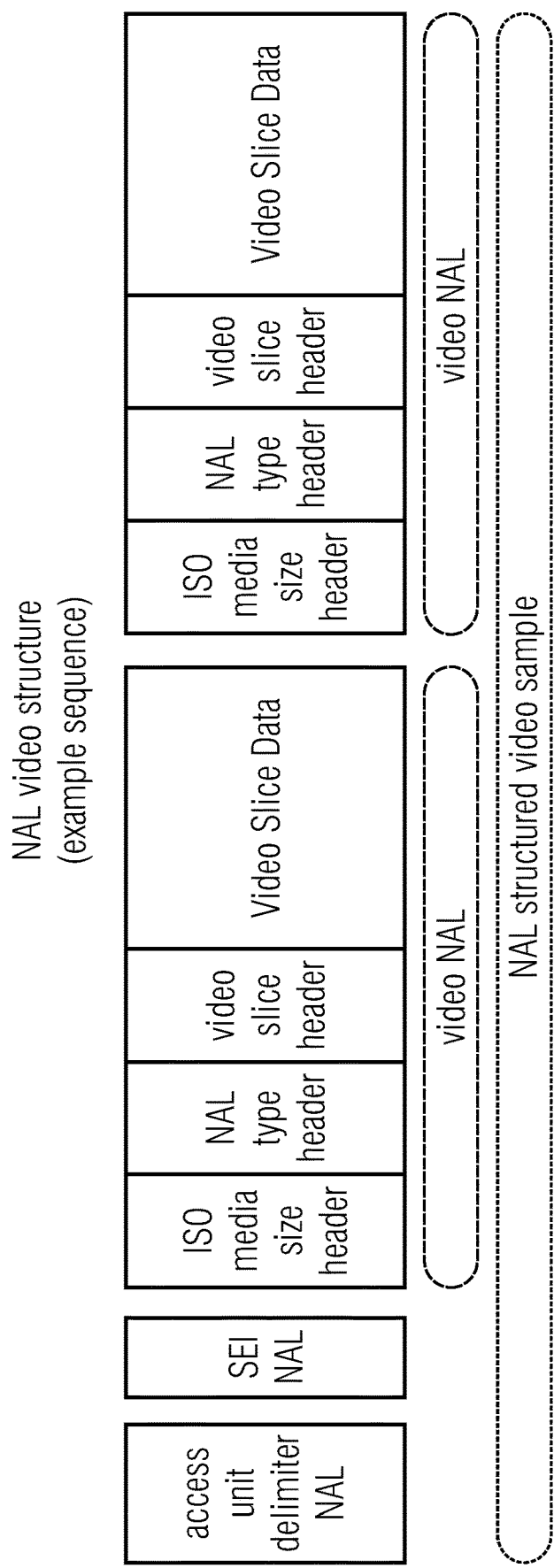
FIG. 2 shows a schematic diagram illustrating a succession of NAL units within a coded media data and the slice structure in an FF container according to [3]

Note that the payload data sections 48 were denoted video slice data in FIG. 2. The sub-picture portions 44 were denoted above as subsamples. Note that the way the manifest 24 defines the relationships between the ROI 2 and the ROI specific set 32 and the extractor may be according to the concept of pre-selections shown in FIG. 4, or according to the concept of FIG. 3. Note also that, although the above description assumed the download to pertain the whole video picture area 16 available, merely a section thereof which includes the ROI may be covered by the downloaded stream 40. That is, the borders are found by alternatingly decrypting and continuing the parsing so as to decide whether another block 52 of the respective subpicture portion's coding payload section 48 is to be decrypted or not.

In effect, the concatenation or combination of file handler 84 and decryptor 86 from a an apparatus for recovering a video stream from a downloaded ROI specific set 32 of bit streams 12 and a corresponding extractor 20. The video stream may be fed into decoder 88 which may optionally part of that apparatus or not. The file handler performs the compilation using the extractor file 20 and the decryptor 86 the decryption of the coding payload sections 48 using the alternating parsing/decryption concept of FIG. 11.

The decryptor 86, in turn, represents an apparatus for recovering a video stream for being decoded by a decoder 88, from compiled bitstream 40, the apparatus being configured to decrypt the coding payload sections of each subpicture portion 44 the alternating parsing/decryption concept of FIG. 11.

Note that, as described, the parsing the coding payload section 48 according to FIG. 11 for sake of finding the payload section borders may be accompanied by a disregarding of explicit border location information possibly comprised in the extractor 20 which, however, might be wrong and merely present therein for sake of file format standard conformance.

The above embodiments enabled an encryption of all subsamples 44 downloaded.

However, in accordance with embodiments described next, encryption may be focused onto one sub-sample 44, for instance. Again, the above description of the introductory specification is initially resumed before presenting broadening embodiments. In particular, here, an index of an encrypted subsample is used for addressing alternation (or allowing alternating) single (one|most important|high-res) subsample encryption, wherein this is combinable with CTR or cbc1 encryption and the usage of preselections.

Based on the subsample identification algorithm illustrated in FIG. 11, an encryption scheme with preselection in the manifest 24 is achieved in which encryption is applied on a sub-picture basis to varying tiles 14 within the picture plane 16 in an alternating fashion, selecting tiles and pictures in a strategy that might regard:

their relative 'importance' to the coding structures and dependencies. For instance, a key frame with a lower temporal level is much more important to the decoding result, e.g. in terms of error propagation.

the relative 'importance' of the depicted content. For instance, higher resolution tiles depicting the current or an expected viewport or directors cut in 360° video applications.

To enable this subsample encryption, an index to the encrypted subsample is signalled so that the decryptor can identify the encrypted subsample 44. For instance, the decryptor may simply count through the subsamples 44 within a sample 42 until the decryptor reaches the signalled index of the encrypted subsample and, by way of gathering the NALU length from the Part 15 header and by identifying how many bytes to decrypt as taught with respect to FIG. 11, it may decrypt the section 48 of that subsample 44. One embodiment would be for the OMAF specification to define a FF Box to indicate the index of the encrypted subsample 44 or to improve the 'senc' box defined in Common encryption [3] that is used to derive encrypted and unencrypted bytes from SAI. The current 'senc' box is defined as follows:

```
aligned(8) class SampleEncryptionBox
    extends FullBox('senc', version=0, flags)
{
    unsigned int(32)   sample_count;
    {
        unsigned int(Per_Sample_IV_Size*8)   InitializationVector;
        if (flags & 0x000002)
        {
            unsigned int(16)   subsample_count;
            {
                unsigned int(16)           BytesOfClearData;
                unsigned int(32)           BytesOfProtectedData;
            } [ subsample_count ]
        }
    }[ sample_count ]
}
```

One embodiment is a new version of the 'senc' box that omits signaling of incorrect byte ranges and instead indicates indexes of encrypted subsamples is as follows.

```
aligned(8) class SampleEncryptionBox_Invention2
    extends FullBox('senc', version, flags)
{
    unsigned int(32)   sample_count;
    {
        unsigned int(Per_Sample_IV_Size*8)   InitializationVector;
        if (flags & 0x000002)
        {
            if (version == 0) {
                unsigned int(16)   subsample_count;
                {
                    unsigned int(16)           BytesOfClearData;
                    unsigned int(32)           BytesOfProtectedData;
                }[ subsample_count ]
            } else if (version == 1){
                unsigned int(32)   EncryptedSubsampleIndex;
            }
        }
    }[ sample_count ]
}
```

Here, EncryptedSubsampleIndex points to the encrypted subsample 44 within the current sample 42.

The just described modification leads to embodiments which may be explained by referring to FIGS. 7 to 11. The following description of such abstracted embodiments focuses onto the amendments relative to the embodiments described so far with respect to these figures. In particular, not all sub-samples 44 of the downloaded stream 40 are encrypted within one sample 42, but merely one sub-sample 44. Which one, may have been decided on the fly or before encryption specifically for the requested ROI 22, or beforehand so that, for instance, the picture portions 34 of the corresponding picture frame 30, which belong to any of the bitstreams 12 within one subset 18, which corresponds to, for instance, the "interesting" scene content, are encrypted, thereby leading to a corresponding encrypted subsample 44 in the downloaded stream 40.

Having said this, FIG. 7 shows, in accordance with the latter alternative, a collection of data 10 for downloading an ROI-specific video stream by tile-based video streaming, which comprises bit streams 12, each having encoded thereinto one of portions 141 of video picture area 16, so that each portion 14 of the video picture area is encoded into a subset 18 of the bit streams 12 at different qualities, and at least one extractor 20 associated with an ROI 22 of the video picture area, as well as a manifest file 24 which identifies, for the predetermined ROI 22, the ROI specific set 32 of bit streams 12 having encoded thereinto the portions 14 of the video picture area 16 in a manner focusing on the ROI in terms of, for instance, higher quality within the ROI 22 compared to outside thereof. The extractor 20 indicates the compilation of the compiled bitstream 40 out of the ROI specific set 32 in the manner described above. However, a predetermined subpicture portion 40 is identified out of the subpicture portions 44 of the compiled bitstream 40. This may be done by identifying a predetermined subset of bitstreams out of the subsets 18 of bitstreams or, synonymously, a predetermined portion 14, so that the picture portion 34 of the selected bitstream 12 of the predetermined subset 18 of bitstreams 12, i.e. the one included in the ROI specific set 32, becomes the predetermined subpicture portion 44 which is the one being encrypted and to be decrypted, in turn. The signaling may be contained in the extractor 20 as described above. It could, alternatively be, however, that this signaling is comprised by the sub-picture portions 40. The coding payload section of the picture portion 34 of the bitstreams 18 of the predetermined subset 18 of bitstreams 12, i.e. the subset corresponding to the predetermined portion 14, is encrypted for all bitstreams 12 in that subset 18 so that the downloaded stream 40 comprises the encrypted sub-picture portion or subsample 44 for the predetermined portion, irrespective for the chosen quality for that portion 14 according to the ROI specific set 32.

The data downloaded according to the latter embodiment, represents a video stream, comprising the ROI specific set 32 of bit streams 12 and the extractor 20, wherein the ROI specific set 32 of bitstreams 12 has encoded thereinto the portions 14 of the video picture area, and the extractor 20 indicates the compilation of the compiled bitstream 40 out of the ROI specific set 32 of bitstreams 12 in the manner outlined above. The predetermined subpicture portion 44 in this compiled bitstream is identified out of the subpicture portions 44 of the compiled bitstream 40 by signaling contained in at least one of the extractor 20 or the sub-picture portions 44. The coding payload section of the predetermined subpicture portion is encrypted.

In line with above re-interpretation of FIG. 7, FIG. 10 may, according to a corresponding alternative embedment, show an apparatus for downloading an ROI-specific video stream by tile-based video streaming, i.e. a client, differing from the above description with respect to the encryption of merely the identified sub-picture portion. That is, the DASH client inspects the manifest file 24 so as to, depending on the wished ROI 22, identify and download the ROI specific set 32 of bit streams 12 along with the extractor 20, i.e. the video stream outlined in the previous paragraph. The file handler 84 compiles, using the extractor 20, the compiled bitstream 40 out of the ROI specific set 32 of bitstreams 12 by extracting, from each of these bitstreams, the picture portion 34 relating to the current picture frame 30 by parsing the respective bitstream 12 and forming the compiled bitstream 40 out of the extracted picture portions 34 so that the compiled bitstream 40 comprises a sub-picture portion 44 for, and formed by, the picture portion 34 of each of the ROI specific set 32 of bitstreams 12 the compiled bitstream is formed of. The decryptor 86 identifies the predetermined subpicture portion 44 out of the subpicture portions 44 of the compiled bitstream 40 for the current picture frame 30 on the basis of the signaling which, as mentioned, may be in at least one of the extractor 20 with such a signaling being called EncryptedSubsampleIndex above, or the sub-picture portions. The decryptor 86 then decrypts the coding payload section 48 of the predetermined subpicture portion 44 by finding the border of the coding payload section 48 of the predetermined subpicture portion 44 to be decrypted by the alternating parsing-decryption process discussed in FIG. 11. Likewise, the file handler 84 and decryptor 86 together form an apparatus for recovering a video stream from the ROI specific set 32 of bitstreams and thee extractor 20 by performing the compiling using the extractor 20 and identifying the predetermined/encrypted subpicture portion 44 on the basis of signaling in at least one of the extractor file or the sub-picture portions. It then decrypts the coding payload section 48 of the encrypted subpicture portion by performing the border detection according to FIG. 11.

The decryptor 86, in turn, represents an apparatus for recovering the video stream from the bitstream 40, wherein the apparatus is configured to identify the encrypted subpicture portion 44 on the basis of signaling inbound from outside, namely from the file handler 84 which forwards this information as taken from signaling in the extractor 20, or itself from signaling in the sub-picture portions 44. It then performs the decryption of the coding payload section 48 of the encrypted subpicture portion 44 with forming the border detection of FIG. 11.

The signaling may index or address the encrypted subsample 44 out of the subsamples of the current sample 42 of the compiled bitstream 40 in form its rank in the sample 42 so that the decryptor 84 may count the subsamples 44 in the current sample 42 to detect the $n^{th}$ subsample 44 in sample 42 with n being the rank indicated by the signaling.

The identification of the encrypted subpicture portion for several picture frames may be done in manner so that the several picture frames contain picture frames 30 for which the encrypted subpicture portion 44 corresponds to different portions 14, and/or the several picture frames contain first picture frames for which there is exactly one encrypted subpicture portion 44 and second picture frames, interspersed between the first picture frames, for which no subpicture portion is identified to be the encrypted subpicture portion. That is, for some frames, no encryption may take place with respect to any portion 14.

Again, it is noted that all details having initially been described above with respect to FIGS. 7 to 11 shall also apply to the embodiments having been described thereinafter with respect to the one-subsample encryption modification except for, accordingly, all details regarding having all or more subsamples encrypted.

Without having explicitly mentioned it with respect to FIG. 11, it is noted that the decryptor 86, in resuming 106 decryption after having encountered 104 a section' 48 trailing border or end, may parse the slice header 46 of the subsequent unit 36 to detect the beginning of the payload section 48 of this subsequent unit 36.

Next, modifications of above described embodiments are described which do not need the alternating decryption/parsing procedure for detecting the encrypted ranges 48. An extended SAI variant which allows 'cbcs' all subsample encryption with preselection described next would allow this 'cbcs' all subsample encryption with preselection, but without the need to parse the slice header. According to next variants, an explicit signaling or straight-forwards derivation of clear and protected data ranges within the extractor track is allowed.

First, a 'senc' box extension using NAL lengths (i.e. extracted bytes) for derivation of encrypted byte ranges is described. As described before, the individual subsamples' sizes in the composed bitstream 32 may vary depending on the extracted data when preselection is used. The video bitstream structure may be used to derive encrypted byte ranges, specifically the Part 15 NALU length headers. One embodiment would be to define a second version of the box as follows:

```
aligned(8) class SampleEncryptionBox_Invention3.1
    extends FullBox('senc', version, flags)
{
    unsigned int(32)   sample_count;
    {
        unsigned int(Per_Sample_IV_Size*8)   InitializationVector;
        if (flags & 0x000002)
        {
            unsigned int(16)   subsample_count;
            {
                if (version == 0){
                    unsigned int(16)       BytesOfClearData;
                    unsigned int(32)       BytesOfProtectedData;
                }else if (version == 1){
                    unsigned int(1)        WholeDataClear;
                    unsigned int(15)       BytesOfClearData;
                }
            } [ subsample_count ]
        }
    }[ sample_count ]
}
```

In this embodiment, a simplification is assumed, which is that a subsample is to be equal to a NAL Unit. The size of the subsample is determined by the NALULength. This is found at the first position (e.g. first 4 bytes) of the sample (this applies for the first subsample of the sample) and at position Pos_i=Sum{i=1 . . . N}(NALULengthi) (for the remaining subsamples in the sample). The length of the BytesOfProtectedData is derived as the length of the subsample-BytesOfClearData if WholeDataClear is not 1. If WholeDataClear is equal to 1, BytesOfProtectedData is inferred to be equal to 0 and BytesOfClearData (although in this case mandated to be signalled as 0 in the box/syntax) is inferred to be equal to the subsample length derived from the Part 15 NALU length header.

That is, in accordance with all embodiments for apparatuses described above with respect to FIG. 10, the border detection using alternating decryption and parsing according to FIG. 11 may be rendered superfluous in the following manner: the bitstreams 12 of data 10 are generated so that all picture portions 34 of encrypted bitstreams 12 are merely composed of one unit 36 (NAL unit). That is, per portion 14 the subset 18 of which is encrypted, there is merely one NAL unit per picture portion of the current frame 30. As each subsample 44 of the composed bitstream is formed by such as picture portion—namely if same is part of a bitstream 21 belonging to the ROI specific set 32—each encrypted subsample 44 is one NAL unit long, too. Note the above alternatives: the encrypted subsamples per frame 30 may be all or merely one. The alternating decryption/parsing border detection is then replaceable by a simple derivation of the length of the coding payload section 48 of the encrypted subpicture portions 44 from a header within these subpicture portions 44, namely the NAL unit header 46. The process of parsing the headers of encrypted subsamples 44 with respect to the length indication is easy to perform and may be made on the fly as owing one to one correspondence between subsamples and NAL units, this information may derived on the basis of the length indication in the corresponding only one NAL unit which length indication lies pretty much at the beginning of the encrypted subsamples.

Another option to avoid the alternating decryption/parsing border detection may be called CENC: a "FF-'senc' inheritance box" is used to inherit subsample sizes from any sub-picture track or bitstream 12 into extractor track or the composed bitstream 40, respectively.

Figure 12:
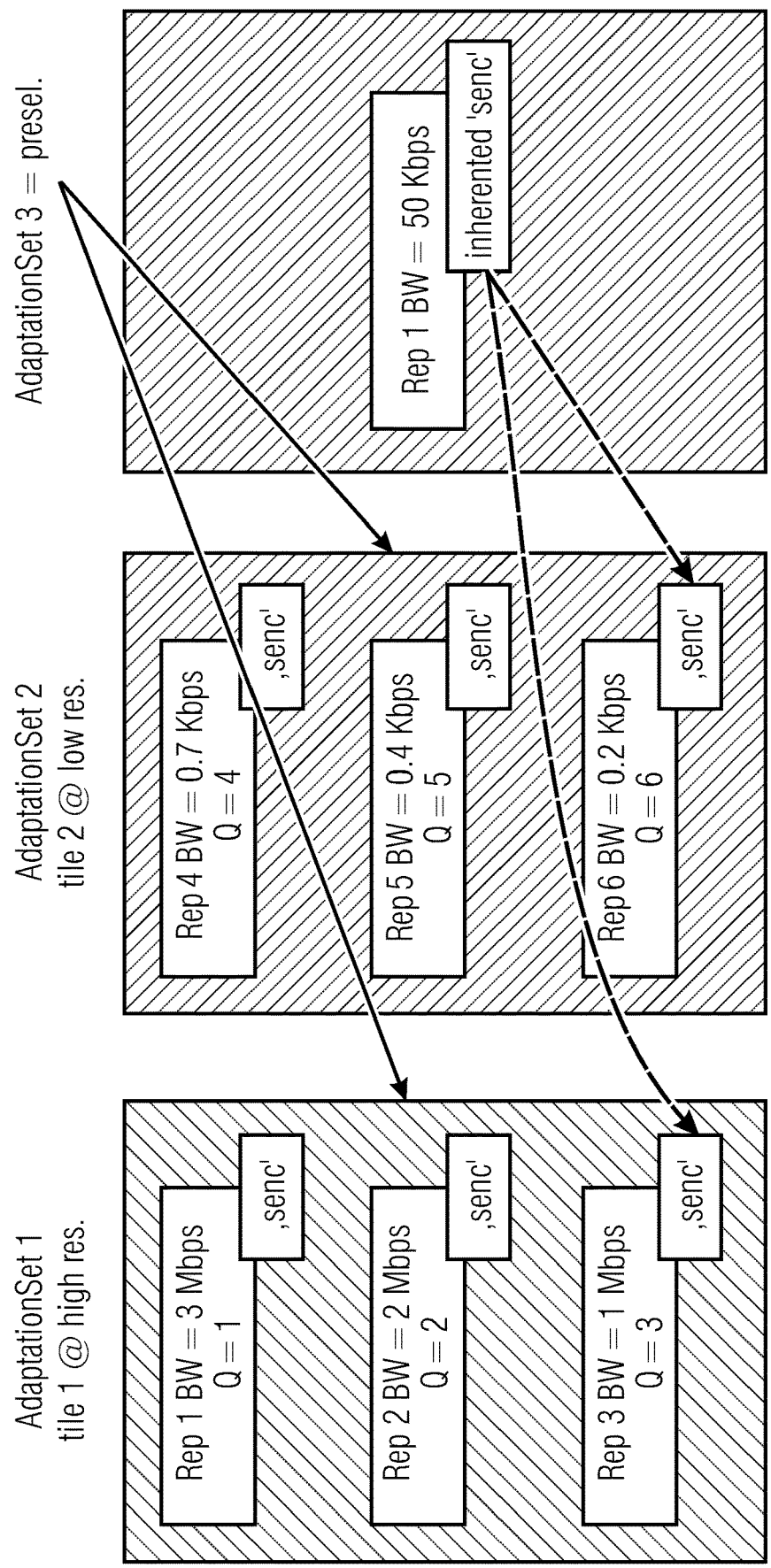
FIG. 12 shows a schematic diagram illustrating representations in a manifest file (MPD) using preselections, two tiles and one extractor track.

The aim of this option is to define an inheritance box that derives the subsample values from the dependent tracks (bitstreams 12 of set 32). The dependent tracks are signalled in the 'tref' box in the 'moov' box, i.e. the extractor 20. This information is used to get the samples from the dependent tracks, thereby becoming subsamples 44 of composed bitstream 40. In a similar manner, the BytesOfProtectedData can be inherited by a box (e.g. 'senc' box) of the dependent track with some hints (e.g. offsets how to find it) and the BytesOfClearData signalled in the inheritance box since this is the same size, and independent of the representation used when using Preselections. Hence, inheritance of the 'senc' relevant information from information signalled in the dependent tracks carrying the subsamples is allowed. Hints for gathering this information is signaled in the extractor 20. As illustrated in FIG. 12 that shows an MPD structure with one Adaptation set per Tile, each including 3 Representations with different bitrate versions and one Adaptation set with an extractor track (right-most side). The so called "inherited 'senc'"-box inherits the byte ranges of protected data from the 'senc' boxes within each tile representations as selected on client side.

That is, in accordance with all embodiments for apparatuses described above with respect to FIG. 10, the border detection using alternating decryption and parsing according to FIG. 11 may be rendered superfluous in the following manner: the bitstreams 12 of data 10 are generated so that all picture portions 34 of encrypted bitstreams 12 are accompanied with information such as in the file format (FF) boxes which indicate the payload sections of units of the respective picture portion. This is done in a manner so that the information may be referred to from the extractor 20 irrespective of the bitstream 12 of a subset 18 belonging to the ROI specific set 32, ought to from a subsample 44 of composed bitstream. For example, its collocated among the picture portions of the substreams belong to the same subset 18 and belong to the same frame 30. The alternating decryption/parsing border detection is then replaceable by a simple derivation of the coding payload sections' 48 location within the encrypted subpicture portions 44 by inheriting this information from the bitstreams 12 in set 32. That is, a bitstream length or pointer indication signaled within the bitstream 12 from which the encrypted picture portion 34 is extracted which the respective subpicture portion 44 belongs to, is used to detect the borders 54 and 56 therein.

Note that whatever border detection alternative is used, the client apparatus 10 may be disregard explicit border location information in the extractor 20 which may be wrong and be there merely for standard conformance reasons, or, differently speaking, which might be in there, for instance, because mandatory according to standard, but not correct owing to preselection-inherent freedom in selecting among representations within each adaptation set.

Next, possible extensions of above described embodiments are presented. They may be referred to as 'ces2'—CTR based encryption with subsample initialization vector.

Figure 13:
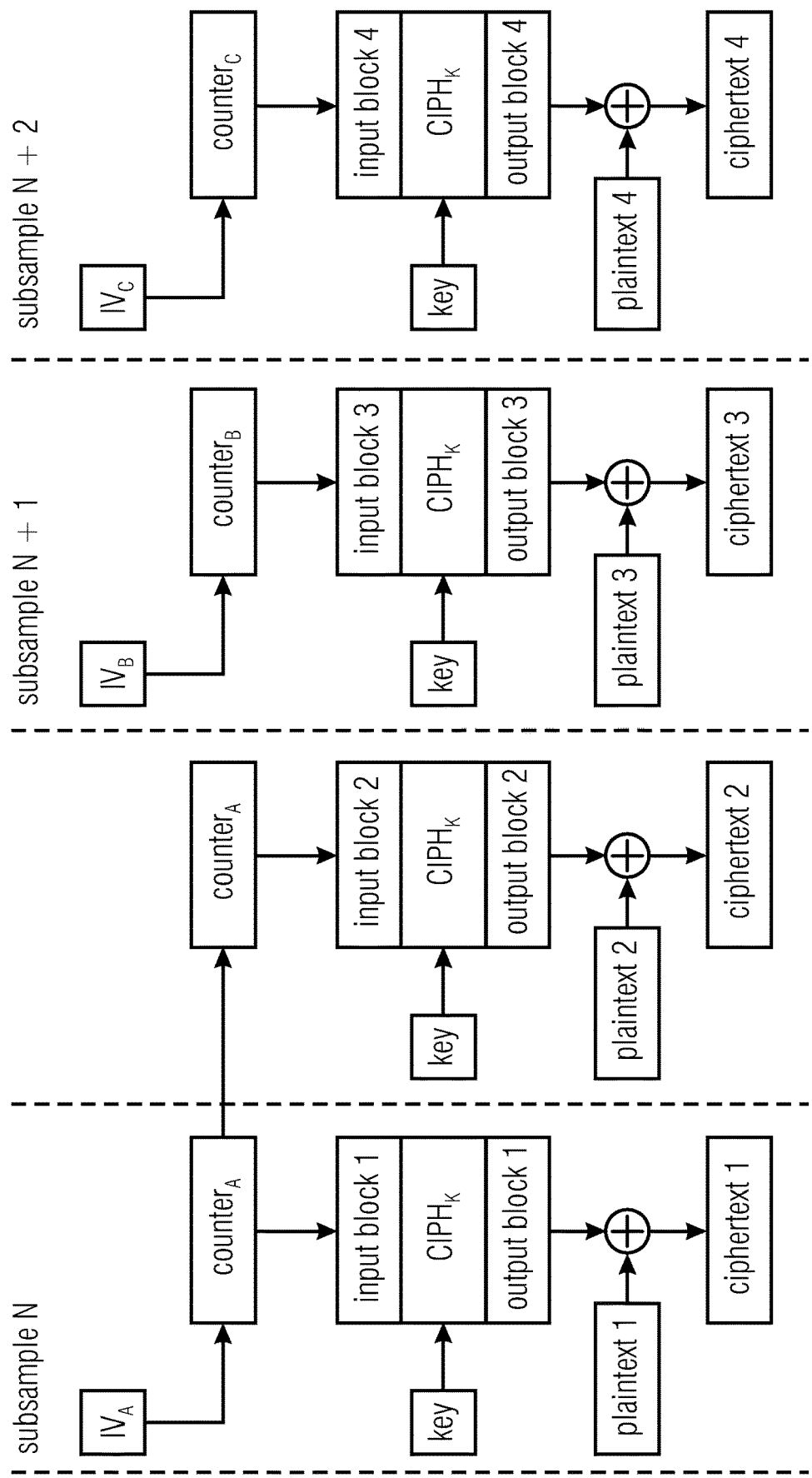
FIG. 13 shows a schematic diagram illustrating CTR based encryption with per-subsample initialization vectors IV and counters.

Here, a CTR based sub-picture encryption scheme is augmented with encryption metadata (i.e. means for allowing re-initialization of the encryption chain for each subsample with an per subsample initialization vector(s)) that allow independence of the encrypted data streams of each tiles. FIG. 13 illustrates this in terms of a block operation diagram. Instead of an IV per sample, the encryption chain is restarted for each subsample (N, N+1, N+2 . . . ) of the sample using per subsample IV (IVA,IVB,IVC) and maintaining respective counters.

A comparison approach which may be used for the CBC based 'cbcs' scheme is to use one IV for all subsamples of the sample. This has the disadvantage to result in similar ciphertext blocks at be beginning of each subsample when the plaintext blocks are similar.

The presently discussed possibilities entail various modes for derivation of the varying per-subsample IVs on client side. First, the IVs can be explicitly signalled in a new version of the 'senc' box as given below.

current picture frame 30 may be based on mutually different initialization states. In other words, in case of encrypting the bitstreams 12 of more than one subset 18, mutually different initialization states are used for these subsets, one for each subset 18. Thereby, mutually different initialization states are derived for each of the encrypted subpicture portions 44 in the composed bitstream. The mutually different initialization states may be the result of applying mutually different modifications to a base initialization state for the current picture frame, called single signalled IV per sample above. The apparatuses described above with respect to FIG. 8 are, thus, able to derive the mutually different initialization states for the encrypted subset of subpicture portions 44 per access unit 4 or current frame 30 by applying mutually different modifications to a base initialization state for the current picture frame 30. The mutually different modifications for each subpicture portion 44 or subset 18, respectively, may be derived depending on the portion 14 of the video picture area 16 which the respective subpicture portion 44 or subset 18 relates to or depending on an index of the respective subpicture portion 44 or subset 18 or portion 14. A calculation or table look-up may be used to this end as described above. The index has been called subsample index above. The extractor 20 may comprise an initialization state list signaling an initialization state for each picture portion 34 within the current picture frame 30. The initialization state may be additionally be signalled in the bitstream the respective picture portion belongs to or stems from.

```
aligned(8) class SampleEncryptionBox__Invention4
    extends FullBox('senc', version, flags)
{
    unsigned int(32)   sample_count;
    {
        if (version = 0){
            unsigned int(Per_Sample_IV_Size*8)   InitializationVector;
            if (flags & 0x000002){
                unsigned int(16)   subsample_count;
                {
                    unsigned int(16)        BytesOfClearData;
                    unsigned int(32)        BytesOfProtectedData;
                } [ subsample_count ]
            }
        } else if (version == 1){
            if (flags & 0x000002){
                unsigned int(16)   subsample_count;
                {
                    unsigned int(Per_Sample_IV_Size*8)
                                            InitializationVectorPerSubsample;
                    unsigned int(16)        BytesOfClearData;
                    unsigned int(32)        BytesOfProtectedData;
                } [ subsample_count ]
            }
        }
    }[ sample_count ]
}
```

A further possibility is to derive the subsample Ns on client side based on a single signalled IV per sample as in the existing 'senc' box but with an additional subsample dependent offset. The offset in this case can either be calculated via an numeric function (e.g. offset equals subsample_index*((2(N*8)−1)/subsample_count) for an N byte counter.

derived from the subsample_index-th entry of an prearranged pseudo-random sequence.

Summarizing, in the above described embodiments, described above with respect to FIGS. 7 to 11, and the modifications thereof described with respect to FIG. 12, the re-initialization for each picture portion 34, within the The following description focuses on another aspect of the present application. In particular, here, the embodiments seek to overcome a problem associated with the usage of preselection adaptation sets, namely the problem that the combinational options offered by such preselection adaptation sets for the client by selecting one representation out of each picture-portion specific adaptation set assigned by this preselection adaptation set to each of regions of an output picture area, are difficult to understand in terms of the quality ranking between these combinational options as well as in terms of the overall location of the ROI within the circumference of the output picture area they correspond to. The following embodiments seek to overcome this problem. As done previously with respect to the encryption/decryption related embodiments, the following description starts with resuming the description set out in the introductory portion of the specification of the present application by way of presenting possible modifications of the techniques set out in the introductory portion. Later on, the embodiments represented by these modifications are then broadened by broadening embodiments.

In particular, to cope with the just-outlined problem one of the following solutions might be used:

First Embodiment

Add max_quality_ranking and min_quality_ranking attributes to the region-wise quality descriptor as shown in FIG. 14.

Second Embodiment

Add a flag indicating scope of the quality values is only within adaptation set as show in FIG. 15.

It would be undesirable to have regions defined in the RWQR descriptor for which local_quality_ranking has different values, since it would be difficult to interpreted the meaning of the qualities of different regions across representations. Therefore, it can be mandated that all RWQR descriptors within an adaptation set shall have the same value for local_quality_ranking. Alternatively the signaling could be done out of RWQR descriptor and add it at the MPD (e.g. at adaptation Set level).

Third Embodiment

Add the RWQR as a delta to a qualityRanking indicated for a representation.

Figure 16:
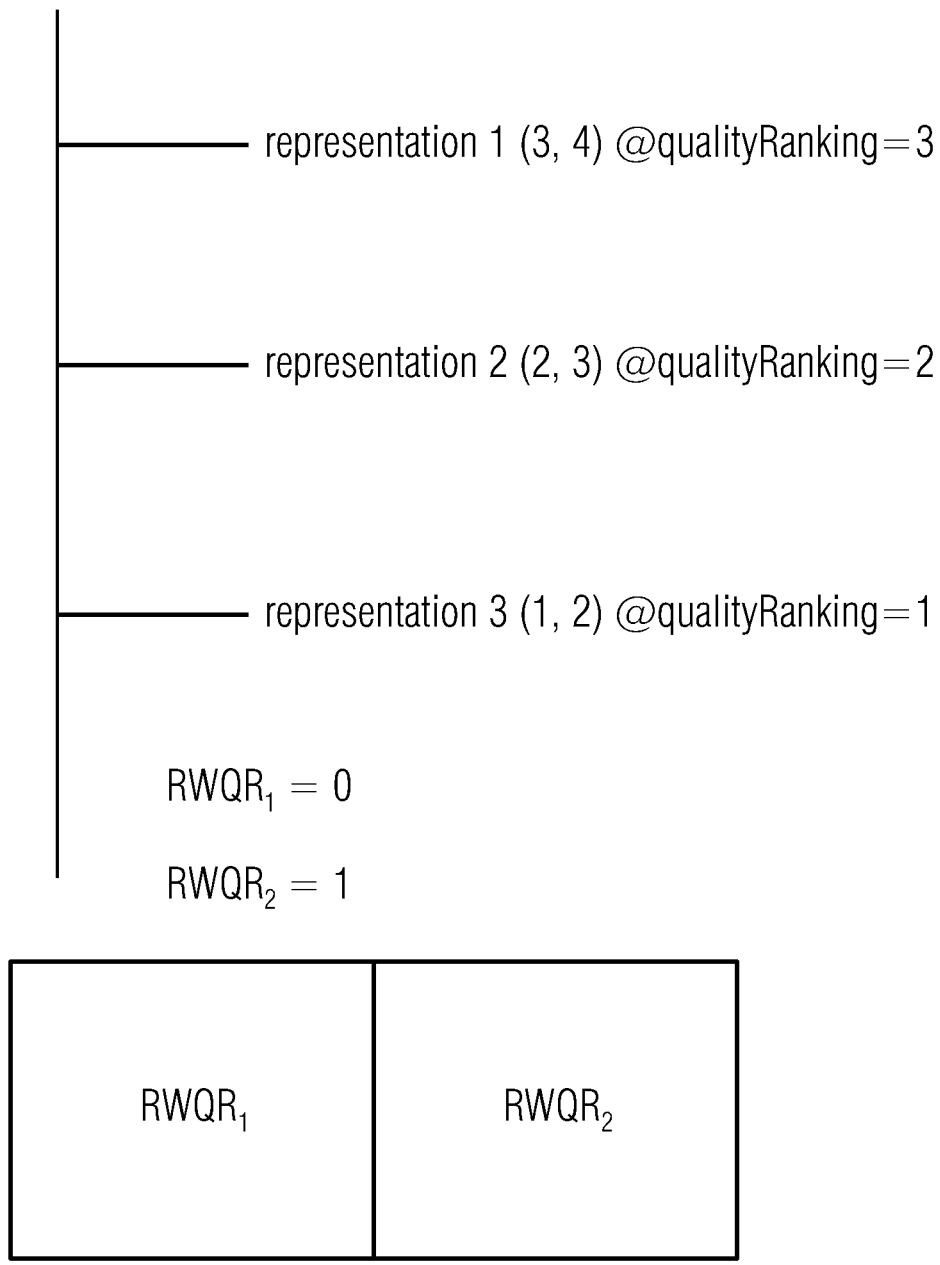
FIG. 16 shows a schematic diagram illustrating an embodiment according to which it is signaled for a preselection adaptation set as to how to offset relative to each other the quality levels indicated for the region-specific adaptation set's quality levels.

It would be desirable to group all representations with same viewport as focus within an AdaptationSet. Therefore, it is helpful to indicate for a given AdaptationSet which region is emphasized and to describe the quality relationships for each region. Such an indication can be used as a grouping mechanism. E.g. in FIG. 16, 3 representations with 2 regions and a quality difference of 1 are specified, while each representation is encoded at a different bitrate and therefore have different qualities (Rep 1=3,4; Rep2=2,3; Rep3=1,2).

In this example we assume that the region of RWQR1 has a better quality as RWQR2 and the region-wise quality descriptors are used on the AdaptationSet level to signal that. The RWQR is therefore use to group the representations and indicate the quality relationship of the regions. This is done as a delta/offset to a quality ranking indicated for the representations themselves. Thus the @qualityRanking attributes from all representations within the same AdaptationSet are used to compute the real quality values of the regions together with the region-wise quality ranking descriptors (RWQR1 and RWQR2).

An option could be to apply the described descriptor to tile-based streaming, in which case the dependencyIds would be used in such a way, that within the AdaptationSet where the region-wise quality ranking descriptors are located, all combinations of Representations and their @qualityRanking attributes have the same relationship (signalled delta in the proposed RWQR). For example, if RWQR1 and RWQR2 values define the delta/offset value of 1, qualityRanking attributes shall have the same relationship.

Obviously, the same approach can be used for other viewport dependent solutions. If the viewport dependency is achieved using a certain projection method, like for example in case of the Truncated Square Pyramid Projection (TSP) (see the example for the projection in FIG. 17) where a part of the 360 video is emphasized by mapping it to the base of the pyramid, which has a higher resolution than the other faces of the pyramid. For such a case, the region-wise quality ranking descriptors are used to signal the relationship in quality of the regions of that projection. For example, in FIG. 17, the region of the front face (represented with the RWQR1 descriptor) has a better quality in respect to all remaining faces (RWQR2).

Figure 17:
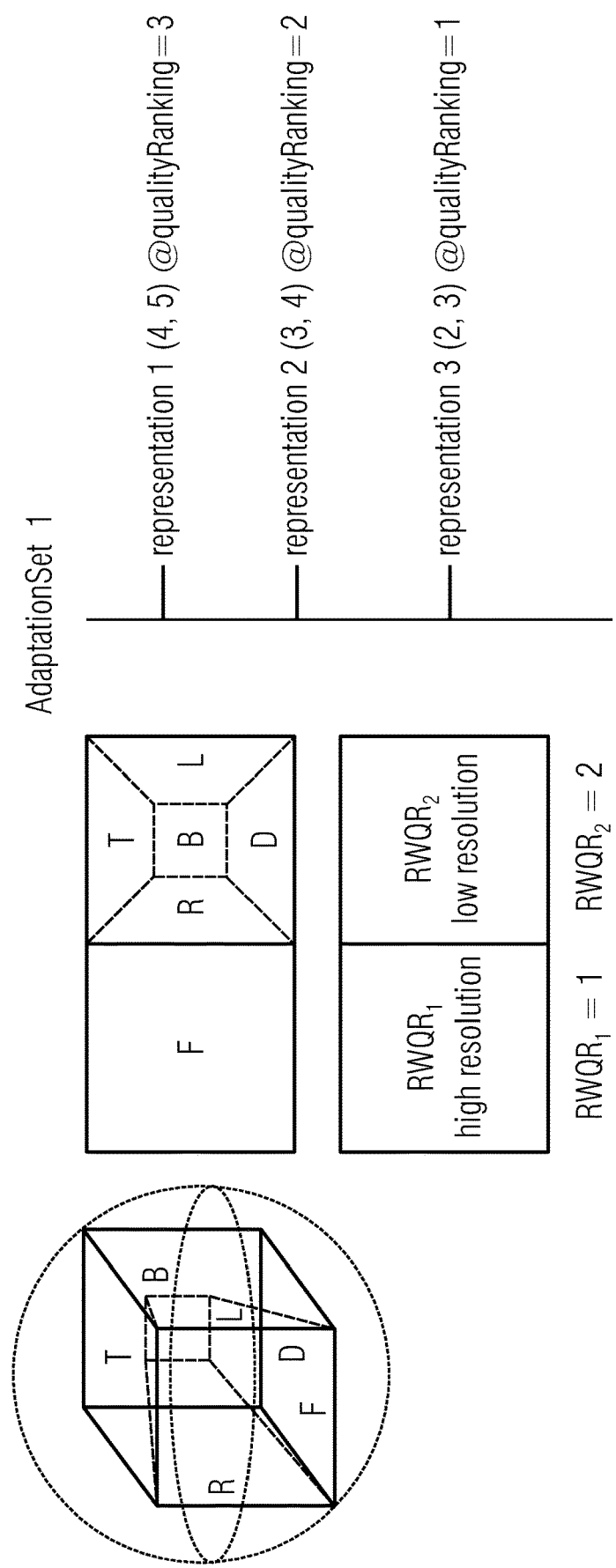
FIG. 17 shows a schematic diagram illustrating the usage of RWQR offsets for truncated square pyramids.
Figure 18:
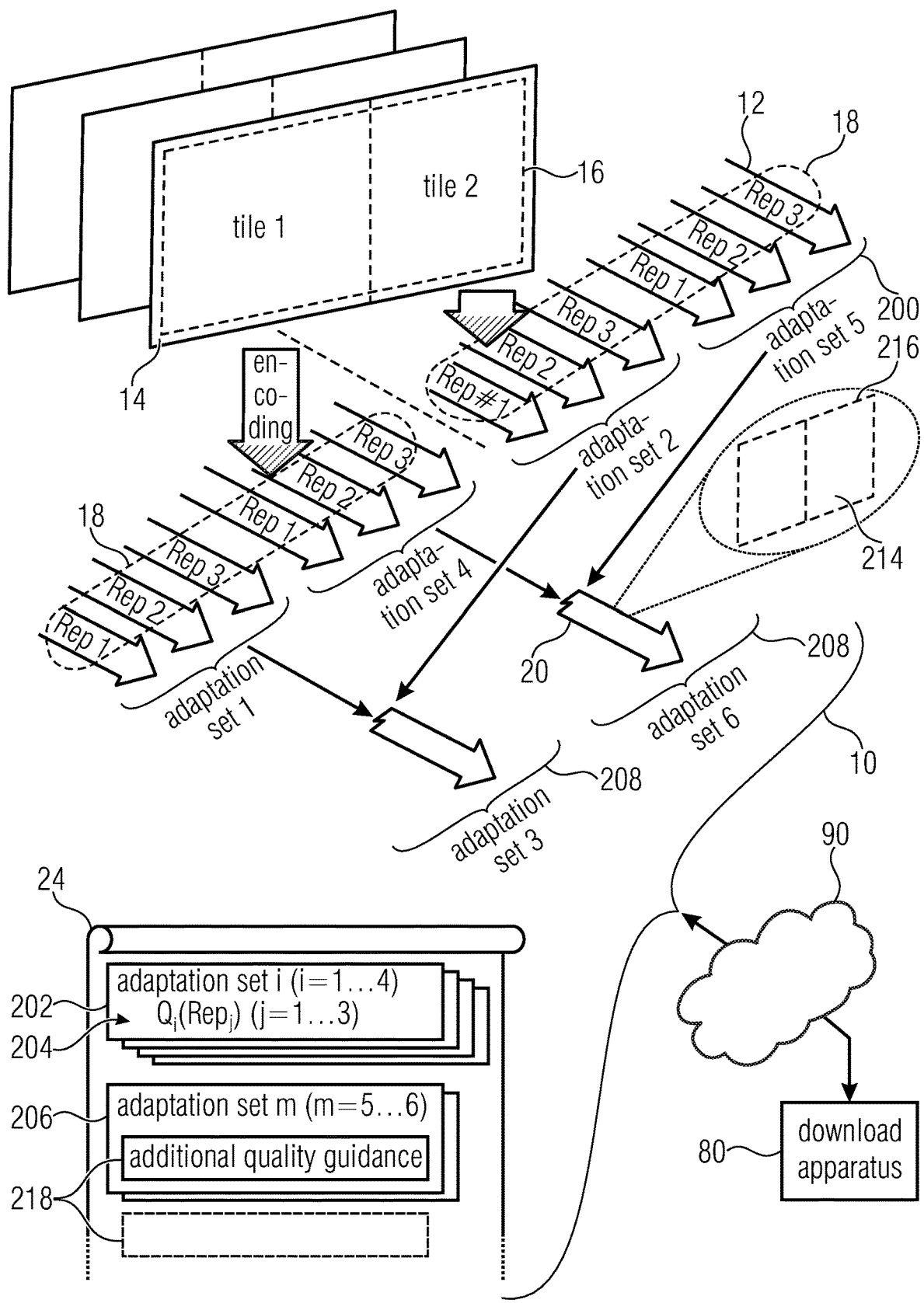
FIG. 18 shows a schematic diagram illustrating the client device and data including representations and manifest file involved in embodiments of the present application relating to improved quality assessment at client side.

In order to describe certain broadening embodiments with respect to the just-outlined modification embodiments, reference is made to FIG. 18 which shows the general environment the following embodiments deal with. Partially, reference signs having been used with respect to the description of FIGS. 1 to 17, are re-used with respect to the description of FIG. 18. The re-usage is used in order to assist in an easier understanding of the following description, but the re-usage shall, naturally, not mean that details set out above with respect to, for instance, en/decryption should be transferable onto the subsequently explained embodiments.

Figure 6:
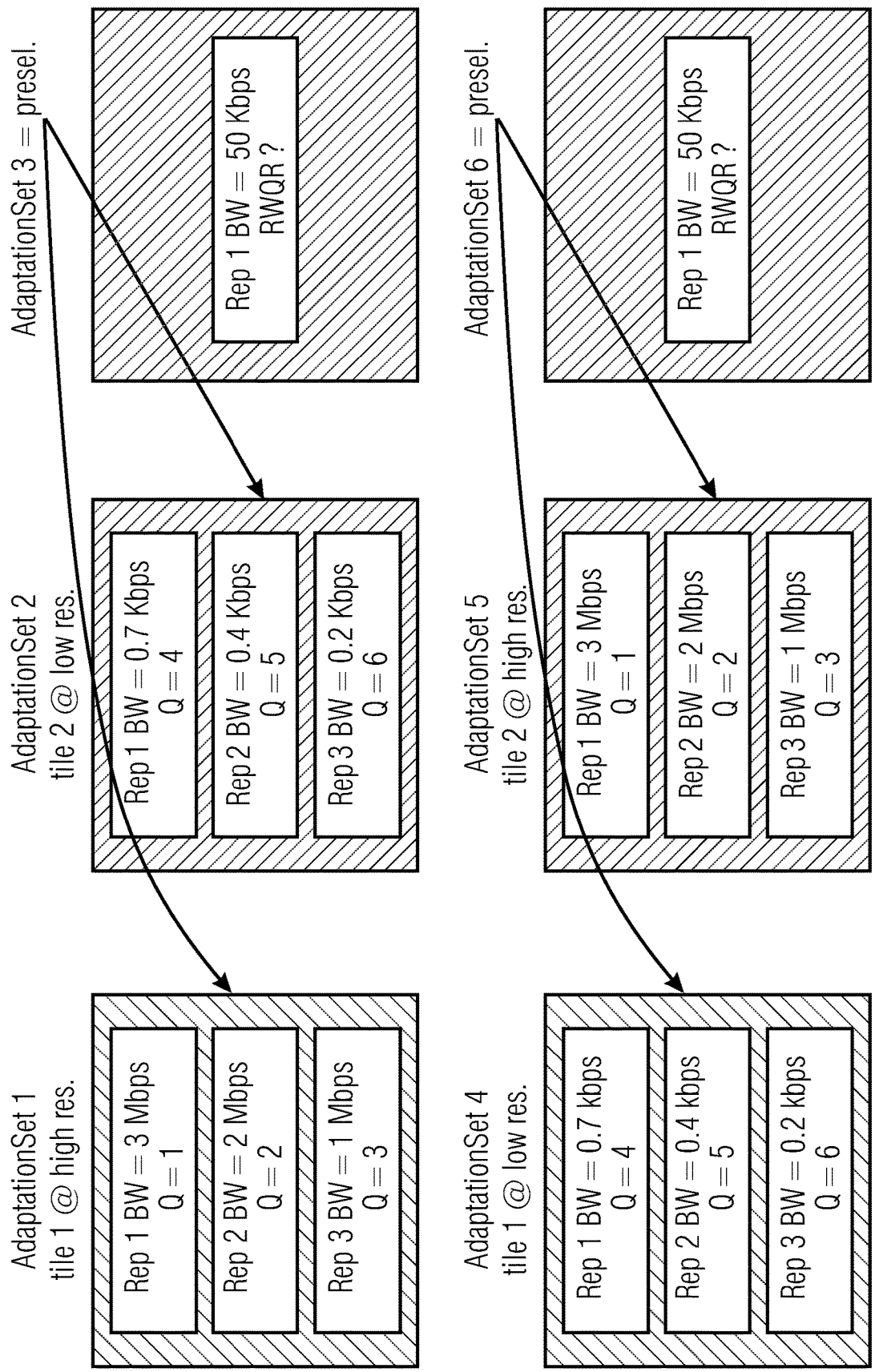
FIG. 6 shows a schematic diagram illustrating two preselection adaptation sets being defined in a manifest file.

FIG. 18 shows a download apparatus or client 80 for downloading, using tile-based streaming, video content from a server or the like. The internal structure of the download apparatus 80 does not necessarily correspond to the one shown in FIG. 10. The download apparatus 80 may, however, comprise a dash client 82 as shown in FIG. 10, for instance, and may optionally also comprise a file handler 84 and, optionally, a decoder 88 and even optionally a decrypter 86. The download apparatus 80 has, via a network 90, access to data 10 including a plurality of bitstreams 12 and a manifest file 24. The bitstreams 12 have a video picture area 16 encoded there into in a tile or portion-based manner. To this, bitstreams 12 are partitioned into subsets 18 with each subset 18 being associated with a certain portion or tile 14 into which the video picture area is partitioned so that the bitstreams 12 of one subset 18 have the same associated portion/tile 14 encoded there into, but at different qualities. As described above, the qualities may mutually differ in one or more of various aspects such as in terms of SNR, spatial resolution and so forth. For ease of understanding, merely two portions/tiles 14 are illustrated in FIG. 18, thereby corresponding to the case depicted in FIG. 6. In further compliance with FIG. 6, FIG. 18 shows the exemplary case where each subset 18 contains six different bitstreams 12. By way of the manifest file 24, each bitstream 12 is indicated to the client 80 as a representation within at least one of adaptation sets 200, so-called scene-portion or picture-portion specific adaptation sets. In FIG. 18, two such portion-specific adaptation sets 200 exist for each tile 14, corresponding to adaptation sets 1 to 4 shown in FIG. 6, but it should be clear that the number of adaptation sets per tile 14 is not restricted to be 2 and may even vary among portions 14. It should also be noted that the physical bitstreams 12 may partially be assigned to more than one adaptation sets 200 or, differently speaking, may represent a representation co-owned by or shared by more than one adaptation set 200. Frankly speaking, the grouping of representations 12 belonging to one subset 18 and, accordingly, referring to the same scene portion 14, is done in a manner so that representations belonging to one adaptation set 200 are, at least in average, higher in quality than the representations of the same subset 18 belonging to another adaptation set. The grouping of representations 12 of a subset 18 into adaptation sets 200 may even be done in a manner so that any representation of one adaptation set 200 of that subset 18 is higher in quality than in the other representation in the other adaptation set. This is, however, not mandatory and will get clearer from the description brought forward below.

The manifest file 24, at least, comprises first parameter sets 202, namely one for each adaptation set 200. Each parameter set #i, 202, defines the corresponding scene-portion specific adaptation set #i, 200, by associating with this adaptation set #i a certain sub-group of representations 12 within one subset 18 so that the representations 12 within each such adaptation sets 200 have encoded there into the same scene portion 14, but at different qualities. Each of these parameter sets 202 comprises a quality level, or a syntax element 204 indicating a quality level, for each representation 12 within the adaptation set which the respective parameter set defines. To this end, the parameter set 202 defining adaptation set #i has a quality level $Q_i(j)$ for each representation #j within that adaptation set i. This had also been depicted in FIG. 6 at the corresponding adaptation sets 1, 2, 4 and 5, where adaptation set 1 corresponds to portion/tile 1 and adaptation sets 2 and 5 correspond to portion/tile 2. Here, Q corresponds to the quality level indicated by each priority set 202.

Besides, the manifest file 24 comprises parameters sets 206 which define preselection adaptation sets. Each preselection adaptation set 208 assigns to each of regions of an output picture area one of the tile-specific adaptation sets 200. The preselection adaptation sets 208, thus defined, differ in assignment of tile-specific adaptation sets 200 to the regions. Frankly speaking, preselection adaptation sets are ROI specific in that they, for instance, assign adaptation sets 200 of representations 12 of higher quality to a region or regions corresponding to the ROI, compared to qualities of representations 12 of adaptation sets assigned to regions farther away from the ROI, or in that, for instance, they only collect adaptation sets 200 relating to regions at and around the ROI with leaving out regions farther away from the ROI. A problem exists in that, however, the client has to ascertain by itself, and in a manner further outlined below, as to which ROI a specific preselection adaptation sets relates to. The qualities 204 are not suitable to this end by themselves alone as they are merely ordinally scaled within the same set 202 they are comprised by.

Generally, the mentioned regions and output picture area may correspond to a partitioning of the picture or scene area 16 into portions 14 using which bitstreams 12 might have been obtained by tile-based encoding, but the output picture area might alternatively rearrange and/or scale and/or rotate portions 14 to result into an output picture area with this rearrangement and/or scaling and/or rotation possibly being indicated in the manifest file 24 as well, or the output picture area only is composed of a proper subset of the portions 14. In order to ease the description of the main topics of the following embodiments, it shall preliminarily be assumed that the output picture area looks like the scene area 16 and that the portions 14 represent the regions 14 for which each preselection adaptation set 208 assigns one of the corresponding adaptation sets 200. FIG. 18 illustrates, for instance, that adaptation set 6 has an output picture area 216 associated therewith which is, in turn, subdivided or partitioned into regions 214. An extractor or extractor file/track which is comprised by data 10 and which is indicated by reference sign 20, composes a corresponding video data stream, for instance, showing the output picture area 216 by using a representation chosen by the client 80 out of adaptation set No. 5 for encoding one region, and the representation chosen by the client 80 out of adaptation set 4 for encoding the other region 214. However, as just-mentioned, output picture area 216 may differ from any composition of picture areas 14 on the basis of which bitstreams 12 might have been generated using tile-based encoding at different qualities. Adaptation set No. 3 might have associated therewith an extractor file 20, too, and might coincide with adaptation set 6 in shape, size and number of regions compared to the output picture area 216 of the other adaptation set 6.

With respect to FIG. 18 it shall be noted that the existence of the extractor, for instance, 20 is not needed in that the origin of the representations 12 might be of such nature that their picture portions 14 individually coded into these representations are not defined on a common video picture area 16, but on individual ones so that just by their composition by way of the preselection adaptation sets 206, the picture content thereof, i.e. their picture portions 14, are put together to result into regions 214 and, accordingly, the output picture area 216.

Summarizing the description brought forward so far with respect to FIG. 18, each preselection adaptation set 206 leaves some decision up to the client device 80 with respect to the representations 12 chosen for each region 214 of the output picture area 216. Each adaptation set 206 merely associates picture-portion specific adaptation sets 200 to regions 214 with the client device 80 having the freedom to select, for each region 214, one of the representations 12 assigned to that region 214 by the respective preselection adaptation set 206. Here, in this example of FIG. 18, this would mean that, theoretically, there are nine options to choose among for each preselection adaptation set 206. Unfortunately, the qualities 204 provided in the parameter sets do not allow for an assessment where in the output picture area 216 of a preselection adaptation set 208 the ROI lies as the qualities as, without any other means, merely guaranteed to be ordinally scaled portion-specific adaptation set wise. Even further, the client may not even reasonably rank the various combinations options of a certain preselection adaptation set in terms of quality. The above-described embodiments enable to provide the client device 80 with efficient guidance to assess the ROI location of a certain preselection adaptation set and/or asses the ranking among the combinational options for a certain preselection adaptation set 206 in terms of quality and maybe even the meaningfulness of the options considering the ROI specificness of the preselection adaptation set.

To this end, each preselection adaptation set 206 comprises certain additional quality guidance data 218, namely guidance data 218 which enables to define a ranking among the picture-portion specific adaptation sets 200 assigned by the respective preselection adaptation set 206 to regions 214 mutually in terms of quality, and optionally may enable an even finer assessment of the mutual relationship between the representations 12 comprised by the assigned picture-portion specific adaptation sets 200 assigned by a certain preselection adaptation set 206 in terms of quality.

A first embodiment conveyed by the above description of modifications of the technique set out in the introductory portion of the specification of the present application, is described with respect to FIG. 19. According to FIG. 19, each preselection parameter set 206 comprises one or more parameters for each region 214, which indicates a quality level range 220 covering the quality levels 204 of the representations 12 of the picture-portion specific adaptation set 200 assigned to the respective region 214 by the preselection adaptation set defined by this parameter set 216. FIG.

19, for instance, shows that the additional quality guidance information 218 comprises—as indicated by reference sign 219—a quality maximum level parameter and quality minimum level parameter $Q_{i,\,max}$ and $Q_{i,\,min}$ for each region i in order to indicate the ranges 220 within which the qualities of the representations lie, namely $Q_{1\,\ldots\,3}(i)$, of the representations j comprised by the picture-portion specific adaptation sets 200 assigned to the respective region i by the parameter set 206 which the respective guidance information 218 is part of. The parameters of the guidance information 218 define the quality level ranges 220 on a common quality scale 222 so that the client device 80 is able to use the mutual location of the quality level ranges 220 indicated for the various regions on the common scale 222 to assess as to where the ROI of the preselection adaptation set 208 lies to which the second parameter set 206 belongs, namely where the region(s) are located which are of higher quality. The client may, for instance, assume the ROI to be the collation of region(s) 214, for which the quality range 220 is highest, or the collation of region(s) 214, for which the quality range 220 is not minimum among the ranges 220 of all regions 214 within area 216. The client may even derive from the quality level ranges 220 a ranking among the possible representation combinations offered by the corresponding preselection adaptation set defined by the corresponding parameter set 206 in terms of quality. In particular, the pure presence of the range information 219 in the quality guidance information 218 may also represent a signal to the client that the portion local quality levels are also defined on the common scale. That is, quality levels $Q_j(i)$ of a certain region i would lie in the range indicated for region i. In that case, the client may deduce from the pure presence of the range information in the guidance information 218 that the qualities are mutually comparable even across portion specific adaptation sets 200. Alternatively, the presence of the range information in the quality guidance information 218 does not change the circumstance that the qualities 204 are merely scaled ordinally within one set 202, i.e. within one adaptation set 200. In the latter case, a client device 80 may, however, use the range information to map the qualities levels 204 onto qualities defined on the common scale 222. The client may, for instance, assume that the number of representations 12 within a picture-portion specific adaptation set 200 are, in terms of their qualities, uniformly distributed over the quality level range 220 indicated by the guidance information 218 for the corresponding region and accordingly, by additionally using the mutual quality indications or ranking values 204 indicated by the corresponding adaptation set 202 of the picture-portion specific adaptation set 200, the client device 80 is able to determine the qualities of all bitstreams contributing to a certain preselection adaptation set on the common quality scale 222. Let's resume the just outlined example: Using the $Q_{i,\,max}$ and $Q_{i,\,min}$ the client may map $Q_j(i)$ onto $Q_j(i) \to (j-1) \cdot (Q_{i,max} - Q_{i,min}) + Q_{i,min}$ oder $Q_j(i) \to (Q_j(i) - \min_j\{Q_j(i)\}) \cdot (\max_j\{Q_j(i)\} - \min_j\{Q_j(i)\}) \cdot (Q_{i,max} - Q_{i,min}) + Q_{i,min}$. The resulting qualities are all ordinally scaled relative to each other for all j and i. Without the guidance information, the client may merely rank the representations j within each adaptation set i 200 individually.

In the above example of FIG. 14, the guidance information 218 involved the syntax element max_quality_ranking and min_quality_ranking in the RwQR descriptor for each region. Among the possible combinational options of bitstreams offered by a preselection adaptation set a client may, thus, exclude those which would be in conflict with the ROI specificness of the preselection adaptation set because of, for instance, the option leading to regions outside the ROI being of higher quality than the one(s) within the ROI. Additionally or alternatively, the client may use the guidance information so as to obtain a better understanding of the quality offset between the ROI related and ROI distinct regions of the various options in order to decide based on a current situation such as user viewing speed, available network download rate and the like, for instance, which option to choose.

And beyond all, the client may deduce as to where the ROI of a certain preselection adaptation set lies and may, accordingly, select among several preselection adaptation sets available one where the ROI coincides, for instance, with a current user's viewport.

A further embodiment which is derivable from the description of FIG. 15, pertains the following specifics for the manifest file 24. In particular, as explained again with respect to FIG. 20, the quality guidance information 218 may in fact comprise an indication 223 indicating whether the quality levels $Q_i(j)$ of region j as indicated within the parameter sets 202 for the picture-portion specific adaptation sets 200 are defined on a common ordinal scale 222 as depicted in FIG. 20 at the lower half, or whether the quality levels $Q_i(j)$ indicated by these parameter sets 202 are defined on separate ordinal scales 224. When defined on the common ordinal scale 222, the quality levels 204 indicated for the representations within a certain picture-portion specific adaptation set by way of a certain parameter set 202 such as those for tile 1 in FIG. 20, may be compared, in ordinal sense, with the quality levels indicated by another parameter set 202 for another picture-portion specific adaptation set 200 assigned to another region by the same preselection adaptation set 206 which indication 218 belongs to. In so far, indication 218 is a kind of "globality indication". In the other case of being defined on separate ordinal scales, the quality levels 204 indicate the mutual ordinal relationship between the qualities of the representations within the picture-portion specific adaptation set 200 which the parameter set 202 belongs to, which comprises these quality levels 204, but the quality levels 204 of different picture-portion specific adaptation sets 200 assigned to different regions 214 by the preselection adaptation set which the globality indication 218 belongs to, are not comparable with each other, i.e. it may not be determined the quality of which bitstream is better based on the corresponding quality levels 204. That is, if globality applies, the client may compare all $Q_j(i)$ for all j and i. They are ordinally scaled relative to each other globally. Without globality, the client may merely rank the representations j within each adaptation set i 200 individually. The client may then, for instance, determine that the ROI for the preselections adaptation set is the collation of region(s) 214, for which the quality level 204 is highest, or the collation of region(s) 214, for which the quality level 204 is not minimum among the quality levels 204 of all regions 214 within area 216.

In FIG. 19, illustrates that the second parameter set 206 of a preselection parameter set 206 may comprise one or more parameters indicating, for each region 214 of the output picture area 216, a quality level hint for the respective region 214, here exemplified by a quality level $Q'(i)$ representative for region i and the referenced adaptation set 200 respectively. As they are defined in one parameter set, namely 296, they mutually be defined on a common scale. However, the guidance information 218 may comprise an indication for each region i—which may coincide with indication 223 which, in so far control both indications concurrently or which may be used alternatively to indication 223—whether the quality level hint for the respective region 214, i, and the quality levels 204 defined by the first parameter set 202 of the picture-portion specific adaptation set 200 assigned to the respective region 214, are defined on a mutually common ordinal scale so as to be ordinally scaled thereacross, or the quality level hint Q'(i) and the quality levels 204 defined by the first parameter set 202 of the picture-portion specific adaptation set 200 assigned to the respective region i are defined on separate ordinal scales 224. In the former case, all quality levels Q'(i) and Qj(i) might in fact be defined on the common ordinal scale 222 as the quality levels Q'(i) are mutually ordinally scaled anyway owing to their definition in the same set 206. Again, the client may derive based on the Q'(i)'s as to where the ROI of a certain adaptation set 208 lies, and if the indication 223 applies, the client may even gain an understanding of the individual combination options in terms of quality.

In accordance with an even further embodiment, the guidance information 2018 merely comprises the Q'(i)'s without 223 or 218. Even here, the client is able to determine the RIO of a certain preselection adaptation set 206 and, accordingly, to select a matching preselection adaptation set for a wanted view port. In particular, a mere ranking between the assigned picture-portion specific adaptation sets 200 as realized by such quality_ranking parameter Q'(i) enable to client device 80 at least to correctly assess the general quality gradient across the area 216 to find the ROI.

It should be noted that the indication 223 could be interpreted to signal the common ordinal scale 222 for all quality levels 204 of all picture-portion specific adaptation sets 200 coinciding in viewpoint, i.e. coinciding in viewpoint from which the respective portion 14 of the video picture area 16 is captured and which is indicated, for instance, in the respective parameter set 202. This renders the following clear: a described above with respect to FIG. 15, the globality indication 223 would not have to reside within the parameter sets 206 concerning preselection adaptation sets. The globality indication 223 could be positioned in the manifest file 24 or elsewhere.

The latter aspect that the quality guidance information 223 may alternatively be positioned in the manifest file 24 outside parameter sets 206 is indicated in FIG. 18 by dashed lines.

As an alternative to the description of FIG. 19, it should be noted that the indication of quality level ranges 220 for each region 214 a certain parameter set 206 relates to, could be replaced by the indication of a mere quality level offset between quality levels indicated within the picture-portion specific adaptation set related parameter sets 202, i.e. the quality levels 204. Thus, the additional quality guidance 218 would then indicate a relative offset to be applied to the quality levels 204 in order to be comparable to each other. For instance, the quality guidance 218 could indicate that the quality levels of tile 1 have to be increased by a certain value before being compared to the quality levels 204 of the other tile so as to be defined on the common ordinary scale 222. Using such an information 218 on the offsets $\Delta Q_{mn}$ between the qualities $Q_j(i)$ indicated by the sets 202, the client may map $Q_j(i)$ of a certain set i 200 onto $Q_j(i) \rightarrow Q_j(i) - \Delta Q_{ik}$ to compare them with $Q_j(k)$ of a certain set k 200. The resulting qualities are all ordinally scaled relative to each other for all j and i. Without the guidance information, the client may merely rank the representations j within each adaptation set i 200 individually.

Figure 20:
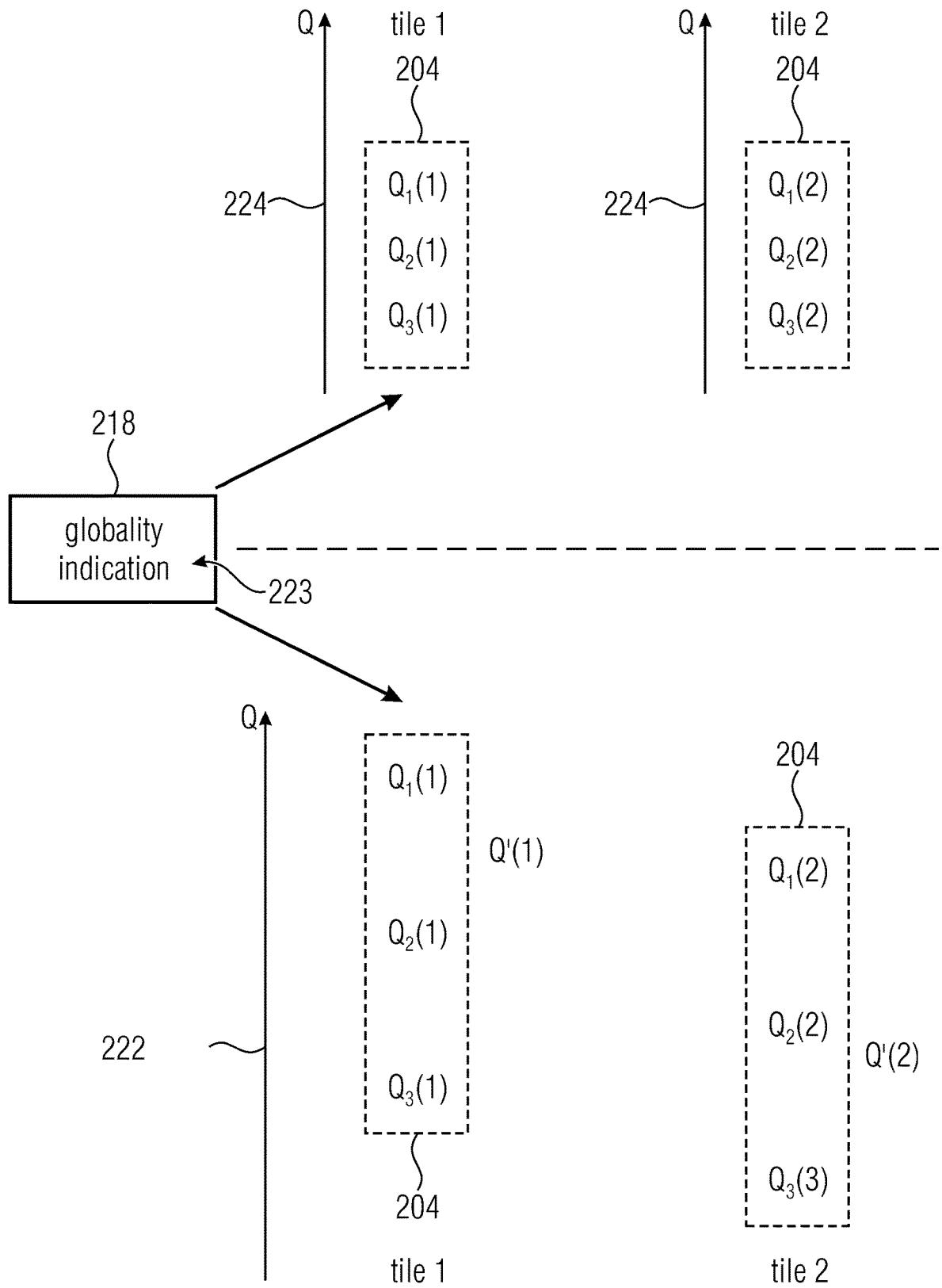
FIG. 20 shows a schematic diagram illustrating the easier quality assessment at client side using globality indication.

As already stated above, the existence of an extractor 20 is not mandatory for achieving the advantages described with respect to FIGS. 18 to 20. If present, however, a file format descriptor/box such as the SphereRegionQualityRankingBox may be used to convey information as descried above wrt to the manifest file. In particular, while the extractor indicates a compilation of a compiled bitstream such as 40 out of subsets of bitstreams each associated with a different one of portions 214 of the video picture area 216, with leaving freedom to select for each portion one bitstream of the associated subset of bitstreams, the file format descriptor would comprise one or more parameters for each portion 214 of the video picture area 216, indicating a quality level range 220 covering quality levels signaled in the representations 12 (here tracks) of the subset of representations assigned to the respective portion 214, or quality offsets between the quality levels of the representations 12 of different ones of the subsets of representations and/or comprise an indication whether quality levels indicated in the representations are defined on a common ordinal scale so as to be ordinally scaled across different ones of the representations of different subsets, or the quality levels indicated by the representations are defined on separate ordinal scales 224, individual for the subsets. In other words, all bitstreams 12 in one set 200 in FIG. 18 may have a quality value in one of its boxes. Likewise, the file format descriptor may additionally or alternatively comprise one or more parameters indicating, for each portion 214 of the output picture area 216, a quality level hint for the respective portion and an indication whether the quality level hint for the respective portion and the quality levels indicated in the representations comprised by the subset associated with the respective portion, are defined on a common ordinal scale so as to be ordinally scaled thereacross, or the quality level hint and the quality levels 204 indicated in the representations comprised by the subset associated with the respective portion are defined on separate ordinal scales 224, and/or comprise one or more parameters indicating, for the portions 214 of the output picture area 216, quality ranking among the portions 214. Upon one of same being put together and referenced by a certain extractor 20, the question may arise as to how the qualities in the bitstreams relate to each other and/or where the ROI for such downloaded video stream is. To this end, a file format box or descriptor may be spent which is ready for download by the client which wishes to present the corresponding ROI to which the extractor belongs. The mentioned file format box has a similar information as thought by 218 for the MPD: It indicates how the qualities in the bitstreams of the various subsets 200 relate to other and where those portions 214 are within area 216 which have higher quality, thereby indicating where the ROI is. In even other words, an extractor 20 associated with a certain ROI collects, by referencing, one subset 200 of representations per region 214. Later on, at the time of actual download, the extractor forms a file along with those representations which have been—one for each subset 200 and associated region—selected out of the respective subset 200. The latter referenced bitstreams 12 form tracks of the file. They from set 32. Each has a quality value in it, just as quality 204 in the MPD. The mentioned FF descriptor would come in addition and would indicate e.g. whether all these quality values, residing in the different tracks stemming from different subsets 200 relating to different regions 214, are defined on the common scale 222 or separate scales 224, or would indicate the ranges 220 on the common scale 222. The FF descriptor might be part of an initialization segment of the composed video stream downloaded by the client which is interested in the ROI associated with the extractor 20 to which the FF descriptor indicating the quality globality belongs: The file has, as mentioned, the referenced tracks 12 of set 32 in there, and the extractor 20. Each referenced track has its quality value in a local FF box/descriptor, for instance, and the FF descriptor/box outlined herein may be part of the initialization segment downloaded first by the client to obtain settings of the file.

For sake of completeness, it shall be mentioned that for each picture-portion specific adaptation set 200, the corresponding first parameter set 202 may define a field of view information with respect to the picture portion 14 encoded into the representations of the respective picture-portion specific adaptation set. The second parameter set 206, in turn, may define a field of view information with respect to a collation of the regions 214, i.e. the field of view resulting from the overlay of all regions 214. If there are more than two second parameter sets 206 of respective preselection adaptation sets 208, as depicted in FIG. 18, each one may define a field of view information with respect to a collation of its regions 214, wherein the collation coincides between said at least two second parameter sets. That is, the circumference of the output picture area 216 may coincide for these sets 208. The preselection adaptation sets 206 may, however, differ in that their parameter sets 206 define a region of highest quality among the regions 214, a location of which within the collation varies over the parameter sets 206. The region of highest quality would, thus, correspond to the ROI with which the various adaptation sets 208 are associated.

The client device may, as described, inspect the manifest file 24 and change, based on the quality level range and/or the indication, a streaming strategy in adaptively streaming a video from a server. It may use the quality levels, quality level ranges, the quality level hints and/or the indication, in order to rank the preselection adaptation sets with respect to a wished viewport.

As explained with respect to FIG. 17, the collections of bitstreams defining the options of preselection adaptation sets may alternatively be defined as different representations grouped into one adaptation set in a manifest file. This yields a manifest file comprising a parameter set for a region-wise compiled adaptation set defining a set of representations coinciding in a subdivision of a video picture area 216 in regions 214, the representations having encoded thereinto the regions 214 of video picture area at different quality level tuples assigning a region-specific quality level to each region. The representations would, accordingly, all cover the area 216 individually. They would differ in association of qualities assigned to the various regions. The parameter set would then comprise an adaptation set quality level indication for all regions, illustrated by $RWQR_i$ in FIG. 17, and for each representation, a representation-specific quality level indication, indicated by @qualityRanking. For each representation, the quality level tuple of the respective representation, indicated in the parentheses in FIG. 17, is then derivable from a combination of the adaptation set quality level indication and the representation-specific quality level indication for the respective representation such as by adding same. The Client device may inspect the manifest file and use the quality level tuples of the representations in a streaming strategy for adaptively streaming a video from a server. It may use the quality level tuples of the representation in order to rank the representations with respect to a wished viewport.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data signals such as data collections, video streams, manifest files, descriptors and the like can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] NIST, "ADVANCED ENCRYPTION STANDARD (AES)", 2001, online: http://nvlpubs.nist.govinistpubs/FIPS/NIST.FIPS.197.pdf
[2] NIST, "Recommendation for Block 2001 Edition Cipher Modes of Operation", NIST Special Publication 800-38A 2001 Edition, online: http://dx.doi.org/10.6028/NIST.SP.800-38A
[3] ISO/IEC 23001-7:2016, Information technology—MPEG systems technologies—Part 7: Common encryption in ISO base media file format files
[4] ISO/IEC 14496-12:2015, Information technology—Coding of audio-visual objects—Part 12: ISO base media file format
[5] ISO/IEC 14496-15:2017, Information technology—Coding of audio-visual objects—Part 15: Carriage of network abstraction layer (NAL) unit structured video in the ISO base media file format
[6] ISO/IEC 23008-2:2013, Information technology—High efficiency coding and media delivery in heterogeneous environments—Part 2: High efficiency video coding
[7] Byeongdoo Choi, Ye-Kui Wang, Miska M. Hannuksela, Youngkwon Lim (editors), "OMAF DIS text with updates based on Berlin OMAF AHG meeting agreements", m40849, 2017-06-16
[8] ISO/IEC 23009-1:2014, Information technology—Dynamic adaptive streaming over HTTP (DASH)—Part 1: Media presentation description and segment formats

The invention claimed is:

1. Server comprising a processor that is configured to provide a manifest file to a client, the manifest file comprising:
first parameter sets each defining one of picture-portion specific adaptation sets of representations, the representations of each picture-portion specific adaptation set having encoded thereinto one of different picture portions at different qualities, wherein each first parameter set comprises a quality level for each representation of the picture-portion specific adaptation set defined by the respective first parameter set;
at least one second parameter set defining a preselection adaptation set which assigns to each of regions of an output picture area one of the picture-portion specific adaptation sets,
wherein
the manifest file comprises an indication whether the quality levels indicated by the first parameter sets are defined on a common ordinal scale so as to be ordinally scaled across different ones of the first parameter sets, or the quality levels indicated by the first parameter sets are defined on separate ordinal scales, individual for the first parameter sets; and
the at least one second parameter set comprises
one or more parameters indicating, for each region of the output picture area, a quality level hint for the respective region and an indication whether the quality level hint for the respective region and the quality levels defined by the first parameter set of the picture-portion specific adaptation set assigned to the respective region, are defined on a common ordinal scale so as to be ordinally scaled thereacross, or the quality level hint and the quality levels defined by the first parameter set of the picture-portion specific adaptation set assigned to the respective region are defined on separate ordinal scales.

2. Server according to claim 1, wherein
for each picture-portion specific adaptation set, the first parameter set defines a field of view information with respect to the picture portion encoded into the representations of the respective picture-portion specific adaptation set.

3. Server according to claim 1, wherein
the second parameter set defines a field of view information with respect to a collation of the regions.

4. Server according to claim 3, wherein there are more than two second parameter sets of respective preselection adaptation sets, each defining a field of view information with respect to a collation of its regions, wherein the collation coincides between said at least two second parameter sets.

5. Server according to claim 4, wherein the more than two second parameter sets define a region of highest quality among the regions, a location of which within the collation varies over the more than two second parameter sets.

6. Server according to claim 1, wherein
the at least one second parameter set comprises
one or more parameters for each region of the output picture area, indicating a quality level range covering the quality levels of the representations of the picture-portion specific adaptation set assigned to the respective region.

7. Server according to claim 1, wherein
the at least one second parameter set comprises
one or more parameters indicating, for the regions of the output picture area, a quality ranking among the regions.

8. Client device comprising a processor that is configured to inspect a manifest file, the manifest file comprising
first parameter sets each defining one of picture-portion specific adaptation sets of representations, the representations of each picture-portion specific adaptation set having encoded thereinto one of different picture portions at different qualities, wherein each first parameter set comprises a quality level for each representation of the picture-portion specific adaptation set defined by the respective first parameter set;

at least one second parameter set defining a preselection adaptation set which assigns to each of regions of an output picture area one of the picture-portion specific adaptation sets, wherein the manifest file comprises an indication whether the quality levels indicated by the first parameter sets are defined on a common ordinal scale so as to be ordinally scaled across different ones of the first parameter sets, or the quality levels indicated by the first parameter sets are defined on separate ordinal scales, individual for the first parameter sets, and the at least one second parameter set comprises one or more parameters indicating, for each region of the output picture area, a quality level hint for the respective region and an indication whether the quality level hint for the respective region and the quality levels defined by the first parameter set of the picture-portion specific adaptation set assigned to the respective region, are defined on a common ordinal scale so as to be ordinally scaled thereacross, or the quality level hint and the quality levels defined by the first parameter set of the picture-portion specific adaptation set assigned to the respective region are defined on separate ordinal scales, and change, based on the quality level range and/or the indication, a streaming strategy in adaptively streaming a video from a server.

9. Client device of claim 8 configured to use the quality levels, quality level ranges, the quality level hints and/or the indication, in order to rank the preselection adaptation sets with respect to a wished viewport.

10. Client device of claim 8 configured to determine a location of a ROI comprising increased quality in an output picture area of a preselection adaptation set based on quality information in the manifest file and compare the location of the ROI with a wished viewport in order to determine the streaming strategy.

11. Client according to claim 8, wherein the at least one second parameter set comprises one or more parameters indicating, for the regions of the output picture area, a quality ranking among the regions.

12. Client device comprising a processor that is configured to inspect a manifest file, wherein the manifest file comprises:

a first parameter set for a region-wise compiled adaptation set defining a set of representations coinciding in a subdivision of a video picture area in regions, the representations having encoded thereinto the regions of video picture area at different quality level tuples assigning a region-specific quality level to each region, the first parameter set comprising an adaptation set quality level indication for all regions, and for each representation, a representation-specific quality level indication wherein, for each representation, the quality level tuple of the respective representation is derivable from a combination of the adaptation set quality level indication and the representation-specific quality level indication for the respective representation, wherein the quality level tuple of the representation representations vary such that a location of a region of highest quality among the regions varies over the representations, and use the quality level tuples of the representations in a streaming strategy for adaptively streaming a video from a server.

13. Client device of claim 12 configured to use the quality level tuples of the representation in order to rank the representations with respect to a wished viewport.

14. Non-transitory digital storage medium storing a file format descriptor for an extractor which indicates a compilation of a compiled bitstream out of subsets of bitstreams each associated with a different one of portions of a video picture area, with leaving freedom to select for each portion one bitstream out of the associated subset of bitstreams, wherein the file format comprises an indication whether quality levels indicated in the representations are defined on a common ordinal scale so as to be ordinally scaled across different ones of the representations of different subsets, or the quality levels indicated by the representations are defined on separate ordinal scales, individual for the subsets; and one or more parameters indicating, for each portion of the output picture area, a quality level hint for the respective portion and an indication whether the quality level hint for the respective portion and the quality levels indicated in the representations comprised by the subset associated with the respective portion, are defined on a common ordinal scale so as to be ordinally scaled thereacross, or the quality level hint and the quality levels indicated in the representations comprised by the subset associated with the respective portion are defined on separate ordinal scales.

15. Digital storage medium according to claim 14, wherein the at least one second parameter set comprises one or more parameters indicating, for the regions of the output picture area, a quality ranking among the regions.

16. Method for operating a client device, comprising: inspecting a manifest file, the manifest file comprising first parameter sets each defining one of picture-portion specific adaptation sets of representations, the representations of each picture-portion specific adaptation set having encoded thereinto one of different picture portions at different qualities, wherein each first parameter set comprises a quality level for each representation of the picture-portion specific adaptation set defined by the respective first parameter set;

at least one second parameter set defining a preselection adaptation set which assigns to each of regions of an output picture area one of the picture-portion specific adaptation sets, wherein the manifest file comprises an indication whether the quality levels indicated by the first parameter sets are defined on a common ordinal scale so as to be ordinally scaled across different ones of the first parameter sets, or the quality levels indicated by the first parameter sets are defined on separate ordinal scales, individual for the first parameter sets, and the at least one second parameter set comprises one or more parameters indicating, for each region of the output picture area, a quality level hint for the respective region and an indication whether the quality level hint for the respective region and the quality levels defined by the first parameter set of the picture-portion specific adaptation set assigned to the respective region, are defined on a common ordinal scale so as to be ordinally scaled thereacross, or the quality level hint and the quality levels defined by the first parameter set of the picture-portion specific adaptation set assigned to the respective region are defined on separate ordinal scales, and changing, based on the quality level range and/or the indication, a streaming strategy in adaptively streaming a video from a server.

17. Method according to claim 16, wherein the at least one second parameter set comprises one or more parameters indicating, for the regions of the output picture area, a quality ranking among the regions.

18. Method for operating a client device, comprising: inspecting a manifest file, wherein the manifest file comprises:

a first parameter set for a region-wise compiled adaptation set defining a set of representations coinciding in a subdivision of a video picture area in regions, the representations having encoded thereinto the regions of video picture area at different quality level tuples assigning a region-specific quality level to each region, the first parameter set comprising an adaptation set quality level indication for all regions, and for each representation, a representation-specific quality level indication wherein, for each representation, the quality level tuple of the respective representation is derivable from a combination of the adaptation set quality level indication and the representation-specific quality level indication for the respective representation, wherein the quality level tuple of the representation representations vary such that a location of a region of highest quality among the regions varies over the representations, and using the quality level tuples of the representations in a streaming strategy for adaptively streaming a video from a server.

19. Non-transitory digital storage medium storing a manifest file, the manifest file comprising first parameter sets each defining one of picture-portion specific adaptation sets of representations, the representations of each picture-portion specific adaptation set having encoded thereinto one of different picture portions at different qualities, wherein each first parameter set comprises a quality level for each representation of the picture-portion specific adaptation set defined by the respective first parameter set;

at least one second parameter set defining a preselection adaptation set which assigns to each of regions of an output picture area one of the picture-portion specific adaptation sets, wherein the manifest file comprises an indication whether the quality levels indicated by the first parameter sets are defined on a common ordinal scale so as to be ordinally scaled across different ones of the first parameter sets, or the quality levels indicated by the first parameter sets are defined on separate ordinal scales, individual for the first parameter sets, and the at least one second parameter set comprises one or more parameters indicating, for each region of the output picture area, a quality level hint for the respective region and an indication whether the quality level hint for the respective region and the quality levels defined by the first parameter set of the picture-portion specific adaptation set assigned to the respective region, are defined on a common ordinal scale so as to be ordinally scaled thereacross, or the quality level hint and the quality levels defined by the first parameter set of the picture-portion specific adaptation set assigned to the respective region are defined on separate ordinal scales.

\* \* \* \* \*